(12) United States Patent
Momonoi et al.

(10) Patent No.: US 7,433,110 B2
(45) Date of Patent: Oct. 7, 2008

(54) THREE-DIMENSIONAL LIGHT RAY INPUT APPARATUS

(75) Inventors: Yoshiharu Momonoi, Tokyo (JP); Kazuki Taira, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 221 days.

(21) Appl. No.: 11/517,328

(22) Filed: Sep. 8, 2006

(65) Prior Publication Data

US 2007/0057145 A1    Mar. 15, 2007

(30) Foreign Application Priority Data

Sep. 9, 2005   (JP)   .............................. 2005-263096
Sep. 4, 2006   (JP)   .............................. 2006-239587

(51) Int. Cl.
*G02B 26/08* (2006.01)

(52) U.S. Cl. ...................................... 359/209; 359/710

(58) Field of Classification Search ......... 359/209–211, 359/362, 363, 709, 710
See application file for complete search history.

(56) References Cited

U.S. PATENT DOCUMENTS 5,959,759 A * 9/1999 Hamada ...................... 359/210
6,753,991 B2 * 6/2004 Shibayama et al. ......... 359/710

FOREIGN PATENT DOCUMENTS

| JP | 11-8863 | 1/1999 |
|----|---------|--------|
| JP | 2003-307800 | 10/2003 |
| JP | 3537218 | 3/2004 |

* cited by examiner

*Primary Examiner*—Euncha P Cherry
(74) *Attorney, Agent, or Firm*—Finnegan, Henderson, Farabow, Garrett & Dunner, L.L.P.

(57) ABSTRACT

A three-dimensional input apparatus includes a lens L1 for converting angular information about light rays from a object, a focusing element L3 for focusing the light rays from the object to the vicinities of an array R of photoelectric elements, and a lens L2 for performing conversion into a real image near the surface of the focusing element L3. The lens L2 is present between the lens L1 and focusing element L3. The array R records light as image signal sequentially. A driver portion drives the optical system and scans light ray information about the object.

34 Claims, 21 Drawing Sheets

IN THE CASE OF QUADROCULAR

DATA

STRAIGHT LINES ARE DISTORTED
AT UPPER AND LOWER ENDS OF A LENS

NOVEL DISPLAY SURFACE

TEMPORARY DISPLAY SURFACE

MAPPED RELATIVE
COORDINATES AT L2

THREE-DIMENSIONAL LIGHT RAY INPUT APPARATUS

CROSS-REFERENCE TO RELATED APPLICATION

This application is based upon and claims the benefit of priority from the prior Japanese Patent Application No. 2005-263096, filed on Sep. 9, 2005 and the prior Japanese Patent Application No. 2006-239587, filed on Sep. 4, 2006, the entire contents of which are incorporated herein by reference.

TECHNICAL FIELD

The present invention relates to a three-dimensional light ray input apparatus for obtaining light ray information displayed on a three-dimensional image reconstruction apparatus.

BACKGROUND OF THE INVENTION

There has been used multi-camera or moving camera as input system to obtain information about a three-dimensional (3D) image.

If a large number of cameras are used, the 3D-image quality is deteriorated due to vareations among the individual cameras and installation accuracy. Furthermore, where moving cameras are used, vareations among driving mechanisms present problems.

The following techniques have been proposed from the past.

A first prior-art technique consists of scanning to take only parallel light rays. It is composed of lens, aperture and imaging-devise, and aperture is disposed at the focal plane of lens to take only parallel ray. (see, for example, JP-A-11-8863).

A second prior-art technique consists of scanning by the mirrors to obtain parallax images and making corrections to the magnification each of the parallax images (see, for example, Japanese Patent No. 3,537,218).

A third prior-art technique consists of obtaining integral photography elemental image using micro lens arrays and relay lenses. A technique is also disclosed increasing the viewing angle by scanning lenses (see, for example, JP-A-2003-307800).

However, in the first prior-art technique, it is necessary to scan readjusting the angle of light rays. Consequently, the scanning range is different from the object range to take images. Furthermore, it is required complex processing for displayed to an auto-stereoscopic display device using lenticular sheets or microlens arrays. Additionally, parallel light images cannot be taken in vicinities of the object because there are not relay lenses. This poses the problem that the equipment is increased in size.

Furthermore, in the second prior-art technique, the magnification varies. This necessitates extra corrective processing. Another problem is that the camera angle needs to be varied to obtain information.

Additionally, in the third prior-art technique, it has three demerits. One, it is limited that a range of light rays gained in one operation because a lens-array is used. Tow, this leads to a deterioration of the resolution. Because the quantity of the individual lens taking lens-array image directly becomes the resolution of the gained 3D-image. Three, the equipment is increased in cost and size. Because the lens-array is necessary size covering the whole range of object.

Accordingly, the present invention provides an inexpensive, space-saving, three-dimensional light ray input apparatus.

BRIEF SUMMARY OF THE INVENTION

According to embodiments of the present invention, a three-dimensional (3D) light ray input apparatus inputs light from a three-dimensional object which is present on a plane consisting of the x-y axes in an orthogonal coordinate system and which has depth in the z-axis direction. The light ray input apparatus has a first optical element, a second optical element, a focusing element, an imaging element, and a recording portion. Each of the first and second optical elements has a length in the y-axis direction. The imaging element can image a two-dimensional image. The first and second optical elements move together in the x-axis direction and scan light coming from the object. The first optical element distributes light rays from around the object onto second optical element. (This distribution of light rays correspond individual incident light-rays angle.) The light onto the second optical element is focused onto the imaging element by the focusing element. The imaging element acts to image the focused light. (The second optical element relays distribution of light rays on second optical element plan to imaging element.) The elemental image which is corresponding individual incident light rays angle and has area onto x-y axes plan is imaged scanning to x-axis direction. The 3D image each position in the x-axis direction correspond each position scanning poison in the x-axis direction. The recording portion records the elemental image taken by the imaging element in the order of the scanning.

Another three-dimensional (3D) light ray input apparatus inputs light from a three-dimensional object which is present on a plane consisting of the x-y axes in an orthogonal coordinate system and which has depth in the z-axis direction. The light ray input apparatus has a light aperture control element, an optical element, a focusing element, an imaging element, and a recording portion. Each of the light aperture control element and the second optical element has a length in the y-axis direction. The imaging element can image a two-dimensional image. The light aperture control element and the second optical element move together in the x-axis direction and scan light coming from the object. The light aperture control element distributes light rays from around the object onto second optical element. (This distribution of light rays correspond individual incident light-rays angle.) The light onto the optical element is focused onto the imaging element by the focusing element. (The second optical element relays distribution of light rays on optical element plane to imaging element.) The elemental image which is corresponding individual incident light rays angle and has area onto x-y axes plan is imaged scanning to x-axis direction. The imaging element images the focused light. The 3D image each position in the x-axis direction correspond each position scanning poison in the x-axis direction. The recording portion records the elemental image taken by the imaging element in the order of the scanning.

A further three-dimensional (3D) light ray input inputs light from a three-dimensional object which is present on a plane consisting of the x-y axes in an orthogonal coordinate system and which has depth in the z-axis direction. The light ray input apparatus has an optical element, a light aperture control element, a focusing element, an imaging element, and a recording portion. The optical element has a length in the y-axis direction. The imaging element can image a two-dimensional image. The optical element moves in the x-axis direction and scans light from the object. The light from the object is incident on the optical element. The light onto the optical element is focused onto the imaging element by the focusing element through the light range control element. (The optical element relays distribution of light rays on optical element plan to imaging element.) The elemental image which is corresponding individual incident light rays angle and has area onto x-y axes plan is imaged scanning to x-axis direction. The imaging element images the focused light. The 3D image each position in the x-axis direction correspond each position scanning poison in the x-axis direction. The recording portion records the elemental image taken by the imaging element in the order of the scanning.

According to the present invention, an inexpensive and space-saving three-dimensional light ray input apparatus can be offered.

DETAILED DESCRIPTION OF THE INVENTION

A three-dimensional (3D) light ray input apparatus of one embodiment of the present invention is an apparatus which, when a three-dimensional image is reconstructed using a three-dimensional image reconstruction apparatus, records a three-dimensional image necessary for the reconstruction. Therefore, prior to describe the 3D light ray input apparatus of the present embodiment, the 3D image reconstruction apparatus is described.

[A] Three-dimensional Image Reconstruction Apparatus

A 3D image reconstruction apparatus designed to display a three-dimensional image is first described by referring to FIGS. 31-34.

(1) Synopsis of Three-dimensional Image Reconstruction Apparatus

Figure 31:
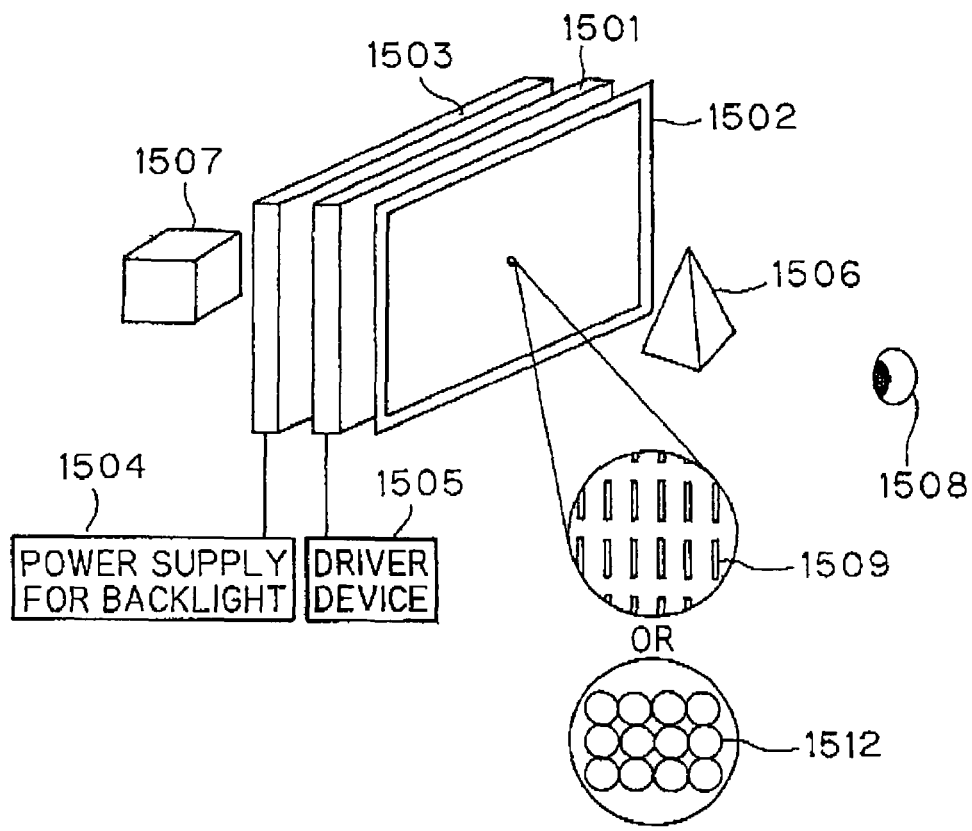
FIG. 31 is a view schematically illustrating the configuration of a three-dimensional image reconstruction apparatus.

FIG. 31 is a view schematically showing the configuration of a three-dimensional image reconstruction apparatus.

A liquid crystal display 1501 has a color liquid crystal display screen on which subpixels of the three primary colors of R, G, and B are planarly arranged in a matrix as described later. The liquid crystal display 1501 is electrically driven by a driver device 1505 such that parallax information is displayed in each column on the display screen. A backlight 1503 is disposed on the backside of the liquid crystal display 1501. Light emitted from the backlight 1503 is shone on the display screen of the liquid crystal display 1501.

A pinhole array plate 1502 is disposed on the opposite side of the backlight 1503, i.e., located between the display screen of the liquid crystal display 1501 and the observer. A three-dimensional real image 1506 is reconstructed by light rays going out of pinholes 1509 in the pinhole array plate 1502. The image is recognized by the observer's eye 1508.

A three-dimensional virtual image 1507 can also be reconstructed by tracing back the light rays from the pinhole array plate 1502 in the direction going away from the real image 1506.

It is also possible to reconstruct a three-dimensional image continuously across (i.e., both ahead of and behind) the pinhole array plate 1502.

Instead of the pinholes 1509, a well-known microlens array 1512 may be used.

(2) Configuration of Three-dimensional Image Reconstruction Apparatus

The 3D image reconstruction apparatus is configured as follows such that it can reconstruct a natural, high-definition stereoscopic image that does not suffer from color breakup when colors R, G, and B are mixed.

Figure 32:
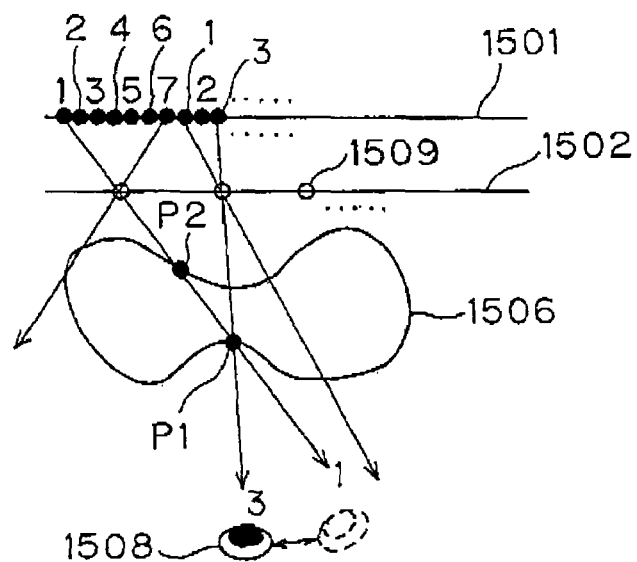
FIG. 32 is a view taken from the above, illustrating the positional relationship between a three-dimensional image reconstruction apparatus and a three-dimensional image.

FIG. 32 is a view taken from above, illustrating the positional relationship between the 3D image reconstruction apparatus shown in FIG. 31 and a 3D image.

The liquid crystal display 1501 which is seen by the observer 1508 to be located behind the pinhole array plate 1502 provides a display of parallax images that are viewed subtly differently according to angle, i.e., a set of multiaspect images. Light emitted from the set of multiaspect images passes through any one of the pinholes 1509 and forms a multiplicity of parallax image light rays. The light rays are collected. As a result, a three-dimensional real image 1506 (stereoscopic image) is reconstructed.

The minimum unit of excitation of the liquid crystal display 1501 that displays a set of multiaspect images planarly is each of subpixels of R (red), G (green), and B (blue). Colors can be reproduced by three subpixels of R, G, and B.

Each subpixel displays information about brightness and color at the point at which a straight line passing through the center of each pinhole 1509 from each subpixel intersects a stereoscopic image on the display space. Generally, there are plural points at which the straight line extending from the same subpixel and passing through the same pinhole 1509 "intersects the stereoscopic image". However, only the point closest to the observer is taken as the displayed point. For example, in FIG. 32, a point P1 closer to the observer's eye 1508 than P2 is taken as the displayed point.

(3) Other Configurations of Three-dimensional Image Reconstruction Apparatus

Figure 33:
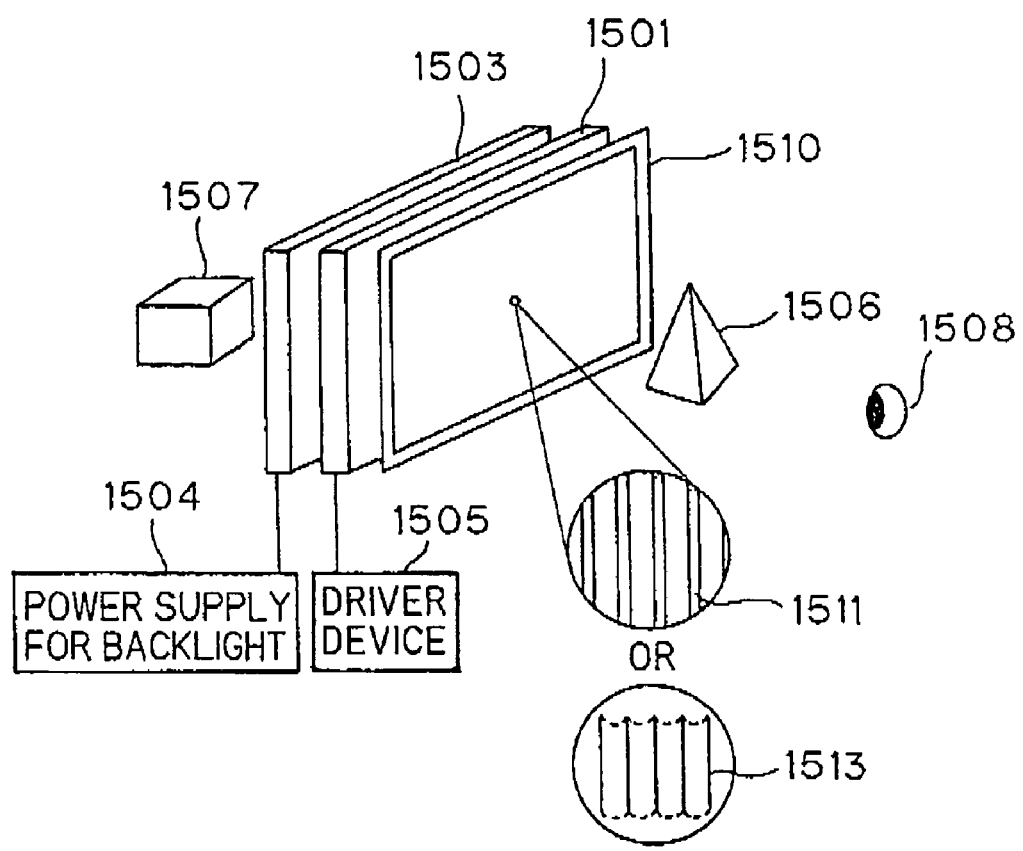
FIG. 33 is a view illustrating a case in which a slit array plate is disposed.

FIG. 33 is a view showing the case where a slit array plate 1510 is disposed instead of the pinhole array plate 1502 of FIG. 31.

Figure 34:
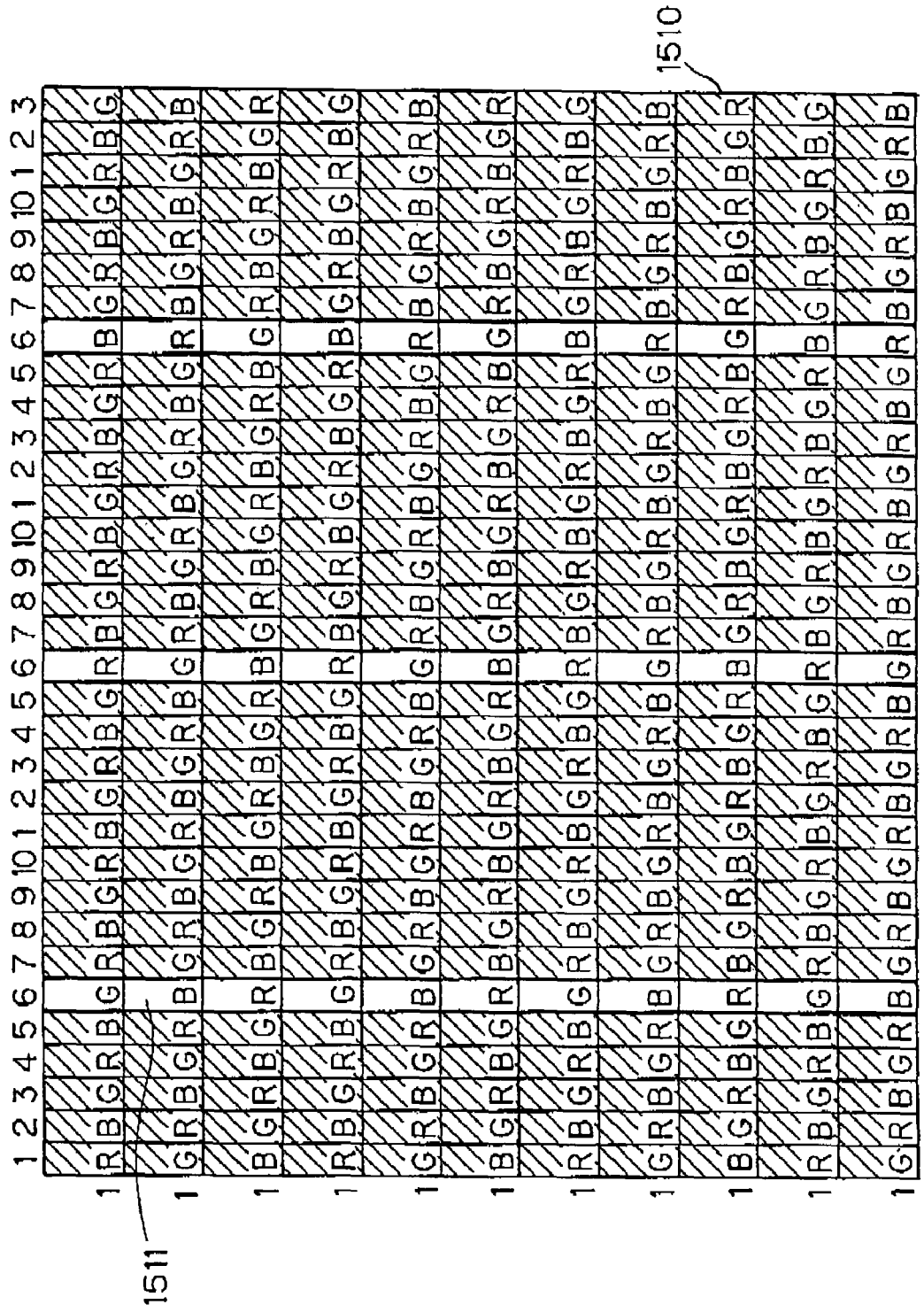
FIG. 34 is a schematic view, taken from the front, of the slit array plate.

FIG. 34 is a schematic view of the slit array plate 1510 as viewed from the front. Where the slit array plate 1510 is used, parallax in the vertical direction is intentionally discarded. The slit array plate 1510 is easier to fabricate than the pinhole array plate 1502, and can reconstruct natural, high-definition stereoscopic images free from color separation in the same way as the pinhole array plate 1502.

A lenticular sheet 1513 may be used instead of the slit array plate 1510.

[B] Theory of Three-dimensional Light-ray Input Apparatus

Three-dimensional light ray information is necessary to reconstruct a three-dimensional image. In the past, three-dimensional light ray information has been obtained from images of multi-camera. This method of acquisition has the following two problems.

The first problem is extra processing for converting into three-dimensional light ray information (elemental image array) from multi-camera image.

The second problem is necessity of special multi-camera which has viewing angle being varied between the horizontal and vertical directions, in order to obtain efficiently correct three-dimensional light ray information, when vertical parallax is discarded.

Accordingly, it is a purpose of the three-dimensional light ray input apparatus of the present embodiment to gain three-dimensional light ray information that is made to correspond to the position of the 3D image reconstruction apparatus as it is.

That is, the three-dimensional light ray input apparatus of the present embodiment scans the optical system and an imaging element, the optical system consisting of a plurality of optical elements to effectively gain a compact and exorbitant amount of three-dimensional light ray information. This apparatus has new feature to obtain correct and efficiency three-dimension light ray information for display which vertical parallax is discarded. The information can display correct three-dimension perspective image at standard viewing distance.

The 3D image reconstruction apparatus can reproduce 3D light ray information by arranging pixels pursuant to the 3D light ray information behind the pinholes 1502 as shown in FIG. 31. To provide such a display, it is necessary to obtain 3D light ray information pursuant to the 3D image reconstruction apparatus.

Figure 3:
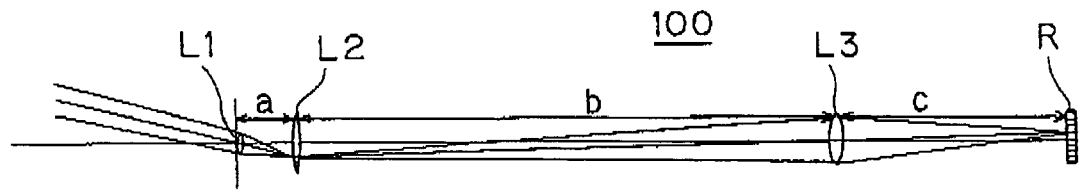
FIG. 3 is a side elevation of the optical system of Embodiment 1 and light rays, in which the light rays are not folded back by mirrors.
Figure 4:
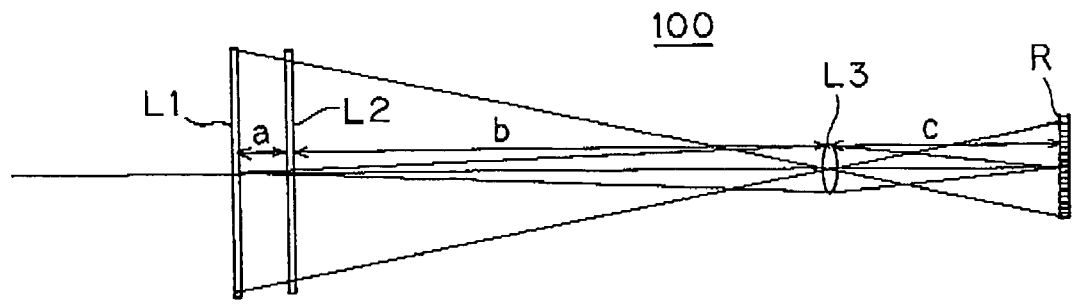
FIG. 4 is a plan view of the optical system of Embodiment 1 and light rays, in which the light rays are not folded back by mirrors.

Accordingly, in the present embodiment, as shown in FIGS. 3 and 4, an optical element L1 corresponds to a light ray control element of the 3D image reconstruction apparatus and converts the angle of light rays from the object into a position on an optical element L2. Where only information about light rays in a one-dimensional direction is presented, it is necessary to gain a perspective image at a viewing distance from the 3D image reconstruction apparatus in no parallax directions. Images coming from no parallax directions are focused imaging element as perspective images by a focusing element L3. The focusing element L3 acts also to gain 3D light rays about parallax directions on the optical element L2.

It is also possible to replace the optical element L1 by a slit or pinhole array. Furthermore, where the optical element L1 and focusing element L3 are made to have a conjugate relationship by the optical element L2; by putting slit or pinhole near on the focusing element L3, similar effect can be obtained without arranging the slit or pinhole array replacing the optical element L1. If a telecentric optical system is adopted as the focusing element L3, similar effect can be produced by placing a slit or a pinhole at the focal plane object-side of the focusing element L3 and making conjugate the slit or a pinhole position and the virtual position of the optical element L1 by the optical element L2.

"Light rays information" is a concept including various kinds of light such as reflected light, transmitted light, and spontaneously emitted light.

[C] Three-dimensional Light Ray Input Apparatus

Embodiments of the three-dimensional light ray input apparatus are next described by referring to drawings.

EMBODIMENT 1

The 3D light ray input apparatus 100 of Embodiment 1 is described by referring to FIGS. 1-4.

(1) Configuration of 3D Light Ray Input Apparatus 100

Figure 1:
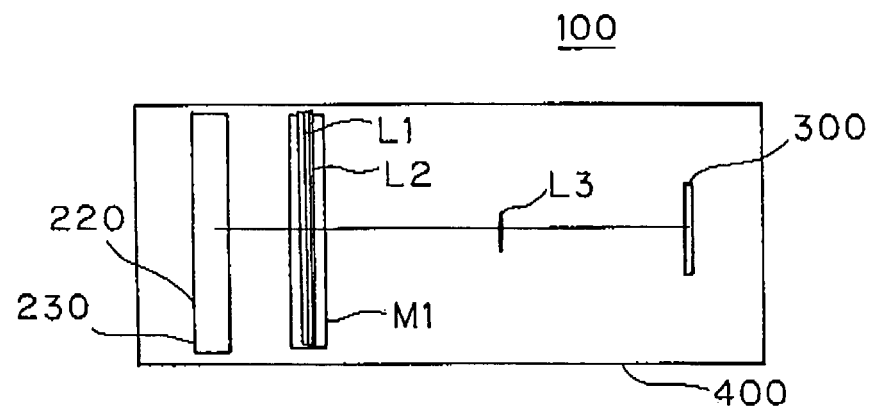
FIG. 1 is a plan view illustrating Embodiment 1 of the present invention.
Figure 2:
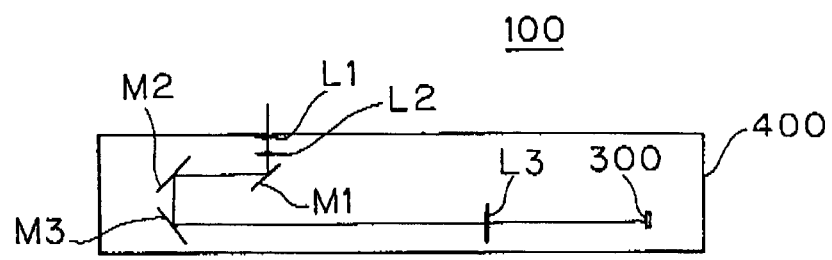
FIG. 2 is a side elevation illustrating Embodiment 1.

FIG. 1 is a top view illustrating the present embodiment. FIG. 2 is its side view.

The 3D light ray input apparatus 100 is composed of an optical system, a driving system for moving the optical system, and an imaging element for scanning image data whenever the optical system is driven and recording portion for recording the image taken by the imaging element. Only the optical system and imaging element within an enclosure 400 are shown.

As shown in FIGS. 1 and 2, a mirror M1 is installed integrally with a cylindrical lens L1 and a cylindrical lens L2. M1 acts to bend an optical axis passing across the lenses by about 90 degrees. Mirrors M2 and M3 receive light from the mirror M1 and fold the light back to the focusing lens L3. An array R(300) of photoelectric elements capable of imaging a two-dimensional image sensor such as CCDs or CMOSes is disposed behind the focusing lens L3.

(2) Definition of Orthogonal Coordinate System

As an orthogonal coordinate system representing light ray information, the horizontal direction (plane parallel to the paper of FIG. 2) of the plane view of FIG. 1 is referred to as the horizontal direction (plane consisting of x- and y-axes), and the normal direction (direction perpendicular to the paper of FIG. 2) of the plan view is referred to as the normal direction (z-axis direction).

According to the x, y, z coordinate system, lens L1, lens L2, and the array R (300) of photoelectric elements capable of imaging a two-dimensional image such as CCDs or CMOSes are elongated in the y-axis direction. The scanning direction lies in the x-axis direction.

(3) Action of Three-dimensional Light Ray Input Apparatus 100

The lenses L1, L2 and M1 move integrally in the x-axis direction. The mirrors M2 and M3 are installed integrally, and move in the x-axis direction at a velocity that is half of the moving speed of the lenses L1, L2 and mirror M1. this motion course not to vary the optical path from the lens L1 if movement is induced by scanning. The area of the mirrors M1, M2, and M3 correspond a light right image area. A necessary area of mirrors is installed pursuant to the area of light rays of an optical system shown later.

(4) Principle of Input by Three-dimensional Light Ray Input Apparatus 100

FIGS. 3 and 4 are views showing the light rays in an optical system, this illustrates are stretched straight and eliminated the mirrors of the present embodiment. FIG. 3 is a side view. FIG. 4 is a top view. (Actually these coordinate system, when clockwise turned by 90 degree, agrees with coordinate system of FIG. 1 or FIG. 2, for object, because this figure shows a state stretched straight.) The principle of input by the three-dimensional light ray input apparatus 100 is described by referring to FIGS. 3 and 4.

Let a be the distance between the cylindrical lenses L1 and L2.

Let b be the distance between the lenses L2 and L3. Let c be the distance from the lens L3 to the array R of photoelectric area sensor.

The image side of each lens is indicated by a positive symbol (+). The object side is indicated by a negative symbol (−). The focal distance f1 of the lens L1 is given by f1=a. The focal distance f2 of the lens L2 is given by −1/f2=1/a−1/b. With respect to the lens L3, the horizontal focal distance f3h and the vertical focal distance f3v are different. The horizontal focal distance f3h is given by $$1/(a+b) - 1/c = -1/f3h$$

The focal distance f3v in the vertical direction is given by $$1/b - 1/c = -1/f3v$$

That is, the lens L1 collects parallel light from the object with the lens width in the horizontal direction. The light focused onto the lens L2 is focused onto the array R of the photoelectric area image sensor via the lens L2 by the lens L3. In the vertical direction, the lens L3 having long depth of focus directly focuses surface of the lens L1 onto the array R of the photoelectric area image sensor. This is almost equal or tantamount to that the lens L3 focuses the object onto the array R of the photoelectric area image sensor.

The number of Parallax about the object as gained is as many as the number of horizontal direction pixels in the array R of photoelectric area image sensor range of light, through the L1, L2 and L3. Using L2 gives wide angle of the elemental image which is corresponding individual incident light rays angle image, without need of use of a wide area sensor. In the vertical direction, the image of the object can be brought to a focus without parallax. The 3D image of the object in the horizontal direction can be obtained by scanning. The image that is scanned by the array R of photoelectric area image sensor is stored in the memory.

The inexpensive, space-saving, 3D light ray input apparatus 100 can be obtained by using the optical system which is area image sensor arrays R of photoelectric elements or plural line image sensor arrays R of photoelectric elements and which folds back light rays by the mirrors as described above. Furthermore, the optical efficiency is improved by using the lenses.

The relation between vertical incidence and exit is shown in FIGS. 35-38.

Figure 35:
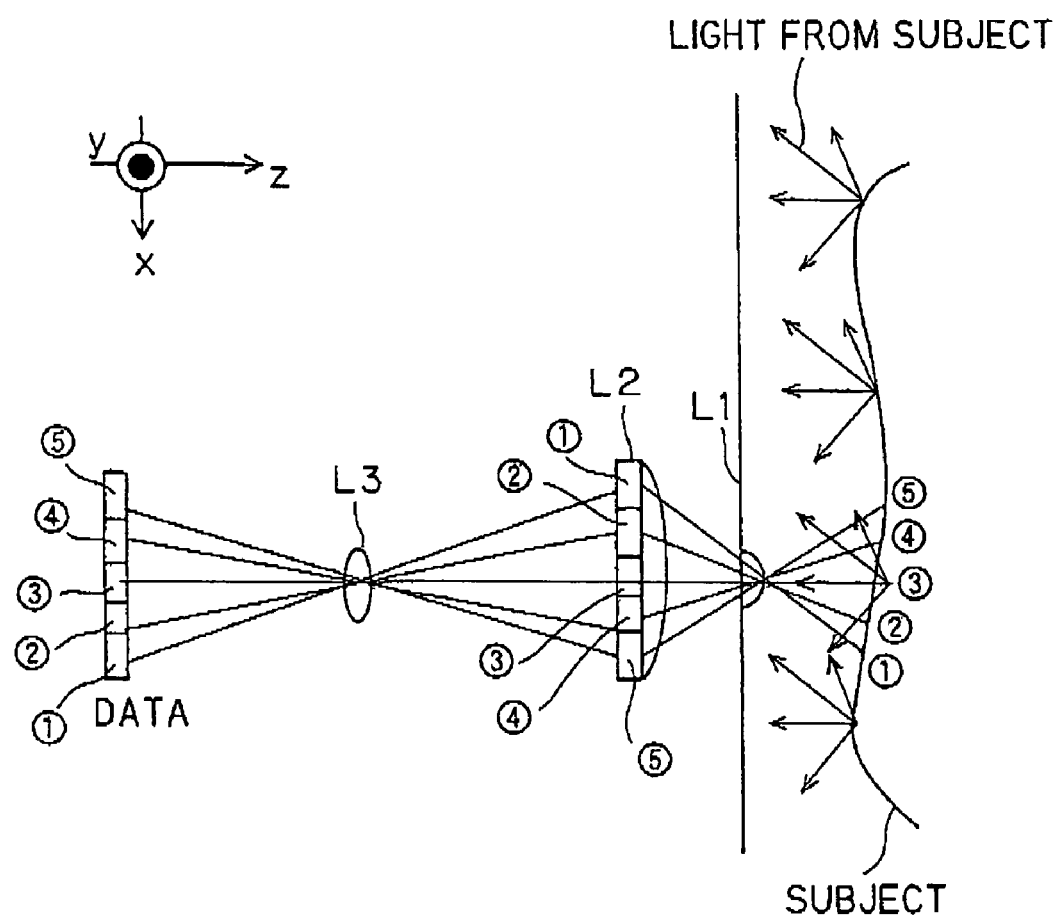
FIG. 35 is a view obtained by inverting FIG. 3 left and right.

FIG. 35 is a side view of the optical system including the object. Back folding at the mirror is omitted. The illuminate light is scattered on the object to every direction. It is shown that real space is able to be reconstructed when information on light rays including light ray direction(s) is obtained as reconstructed. Light rays from various directions of the object are incident on the L1. In the figure, it is showed that circled numerals 1 to 5 example of indicated light rays. Light rays of circled numerals 1 to 5 are collected at the position of the L1 and are distributed different positions on the L2. The light rays are focused onto the array R of photoelectric elements by the L2 and focusing lens L3. At this time, the array of the circled numerals 1 to 5 is inverted. An inversion occurs at the L1. Another inversion occurs at the L3. Therefore, two inversions take place. These are scanned while varying the position of the optical elements and image sensor array. As a result, it is obtained information from a large area.

Figure 36:
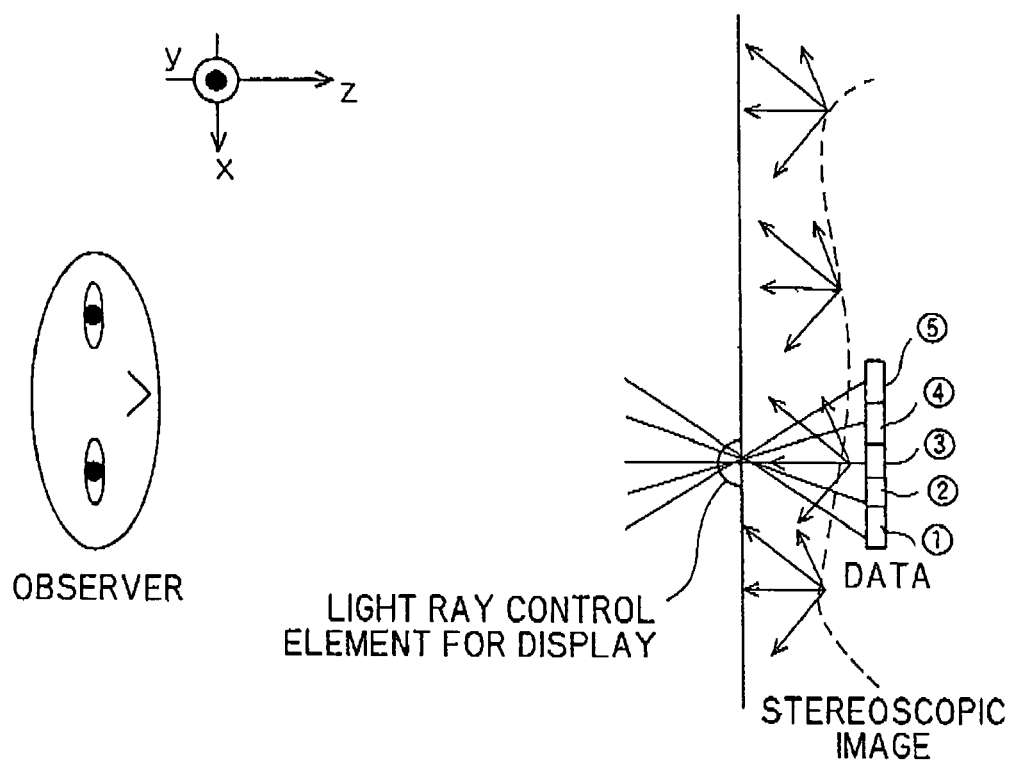
FIG. 36 is a view obtained by rotating FIG. 32 by 90° in a clockwise direction.
Figure 37:
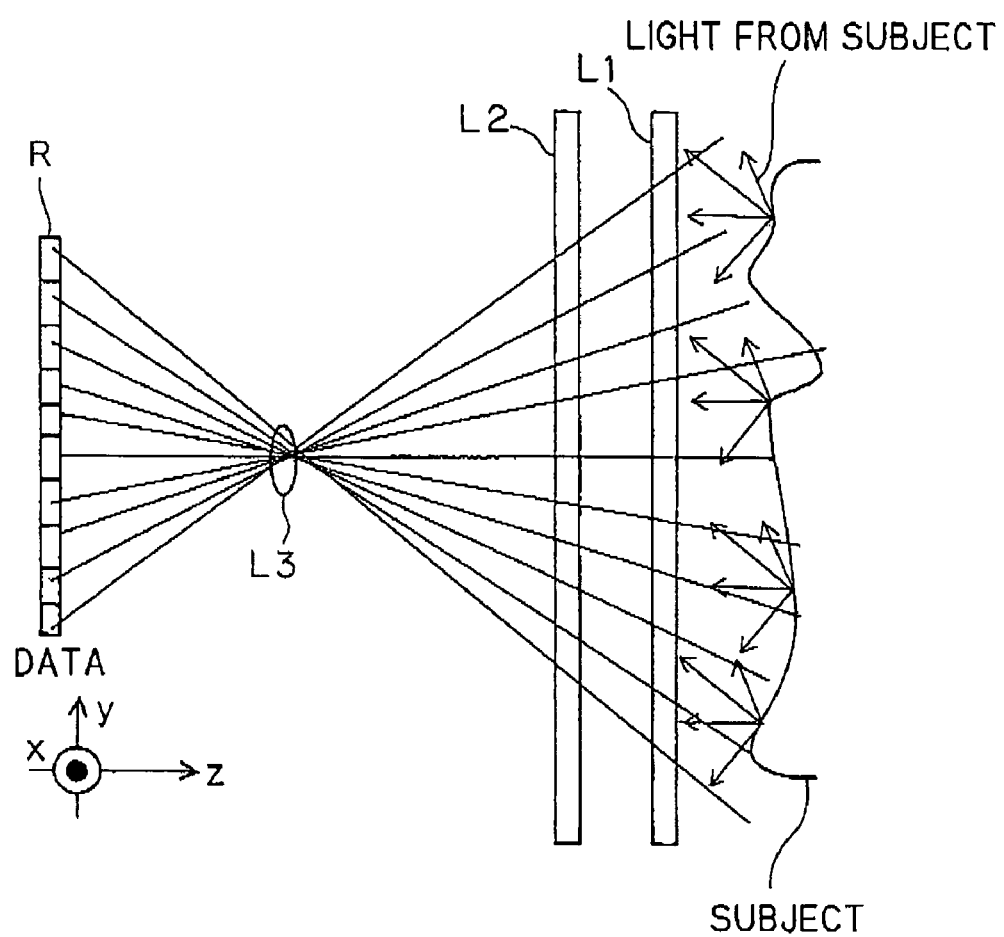
FIG. 37 is a view obtained by inverting FIG. 4 left and right.
Figure 38:
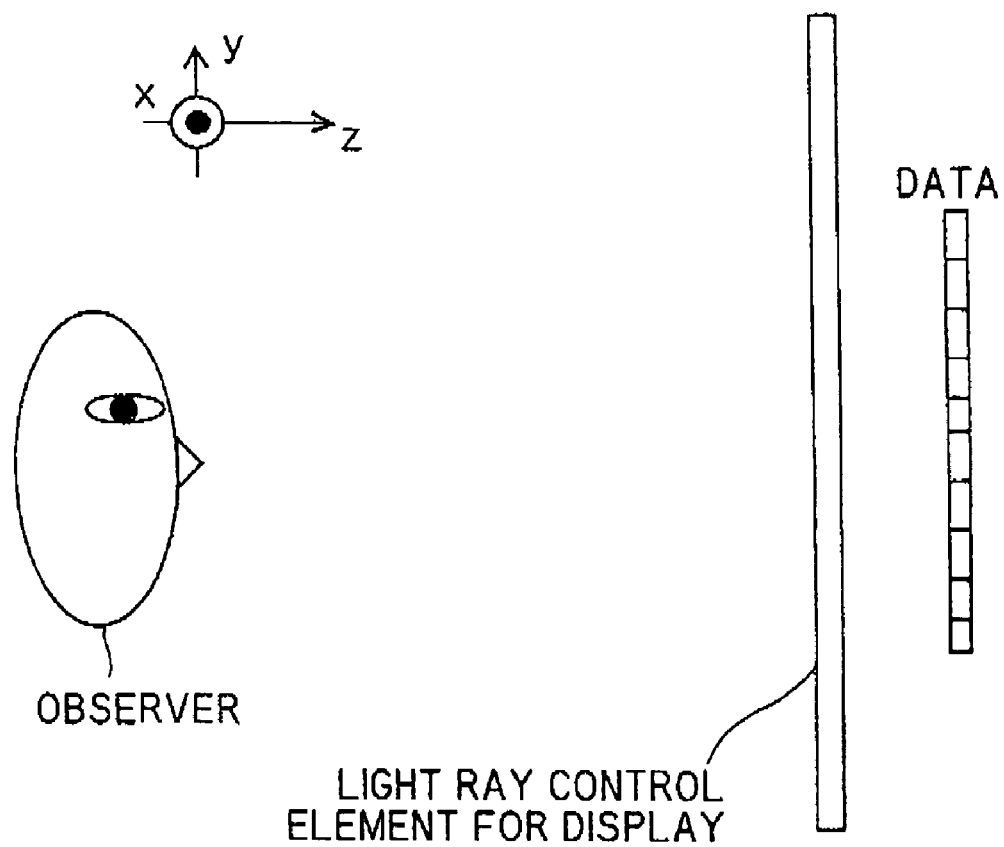
FIG. 38 is a view illustrating discard of vertical parallax.

When a 3D image is reconstructed on 3D display, elemental image which is 3D light ray information is arranged on corresponding individual positions. The elemental image is an image arranged with pixels in correspondence with angle from image plane to light ray control elements such as lenses and slits. As a result, it is displayed 3D images varying with viewing point. This light ray control elements of 3D display corresponds the L1 of 3D light ray input apparatus. When pixels that is obtained from 3D light ray input apparatus are arranged as shown in FIG. 36, light ray is outputted the light ray of object through the light ray control elements (such as lens array, pinhole array, lenticular sheet, or slit array). It can be seen that a three-dimensional object integral of light rays information entered at each position. For example, it is seen that the exactly the same 3D image is reconstructed by arranging the circled numerals 1 to 5 in the illustrated, the circled numerals being gained in FIG. 35.

Where parallax in the vertical direction is discarded, the cylindrical lens is used as a scanning lens as shown in the present embodiment. The lenses L1 and L2 do not act in the vertical direction. In the vertical direction, images is same normally images as shown in FIG. 37. When a 3D display is reconstructed, if a light ray control element (such as lenticular sheet or slit array) doesn't act to display parallax to the vertical direction as same as normal observation of images, as shown in FIG. 38. A perspective image from the shooting position can be observed in the vertical direction in the same way as in the case of normal images. At this time, since a human has two eyes on the left and right sides, he or she can obtain depth information from the only horizontal parallax between both eyes.

EMBODIMENT 2

Figure 5:
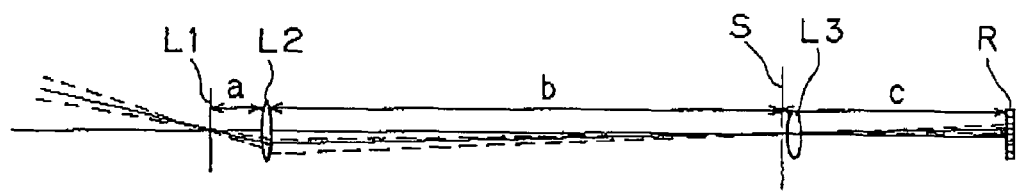
FIG. 5 is a side elevation of the optical system of Embodiment 2 and light rays, in which the light rays are not folded back by mirrors.

A three-dimensional light ray input apparatus 100 of Embodiment 2 is next described by referring to FIG. 5.

(1) Configuration of Three-dimensional Light Ray Input Apparatus 100

FIG. 5 is a side elevation showing an optical system and light rays. In the optical system, back folding using mirrors in the present embodiment is eliminated.

The plan view is substantially similar to FIG. 4. The differences with Embodiment 1 are that (1) there is no lens L1, (2) the lens L3 has a slit (aperture) S, and (3) the focal distance of the lens L3 is the same distance in the horizontal direction and in the vertical direction.

(2) Principle of Input by Three-dimensional Light Ray Input Apparatus 100

The operation of the optical system is almost similar. It is scanning to obtain image data which is the horizontal parallax images and the no-parallax vertical images.

The difference of the optical system is the slit S used in the lens L3. Two effects are obtained by disposing the slit S at the surface of the lens L3 (in the vicinities of the position of the principal point), the slit S providing a contracting action only in the horizontal direction. The first effect is that the pupil of the lens L3 in the horizontal direction decrease and the depth of field increases. Consequently, it is not necessary to vary the focal distance of the lens L3 between the horizontal and vertical directions. The second effect is that the slit S acts as a virtual image and plays the role of the lens L1 of Embodiment 1 (acting as a pinhole lens in the horizontal direction).

In consequence, parallax light rays can be obtained in the same way as in Embodiment 1. Since neither slit S nor the lens L2 acts in the vertical direction, it takes perspective images. Information in the horizontal direction can be obtained by performing scanning.

In Embodiment 2, the focal distance of the lens L3 is same distance in the horizontal and vertical directions and so the fabrication cost is reduced.

(3) Modified Embodiment 1

It is also conceivable to perform scanning via three mirrors in the same way as in Embodiment 1. Lens L2 and mirror M1 are disposed integrally. Mirrors M2 and M3 are moved at a half velocity of scanning M1 to enter light the focusing lens L3 such as same distance.

(4) Modified Embodiment 2

It is also conceivable to control the shape of the aperture S incident on the L3 in the vertical direction and in the horizontal direction independently. The size of the aperture in the vertical direction corresponds to the image depth of field. The size of the aperture in the horizontal direction corresponds to the obtained resolution (resolution of the light rays) in the horizontal direction. If the aperture is made smaller, obtainable is better resolution of the light rays. However, the aperture is corresponded the amount of light (exposure) in use, the aperture is adjusted vertically and horizontally according to the circumstances.

EMBODIMENT 3

Figure 6:
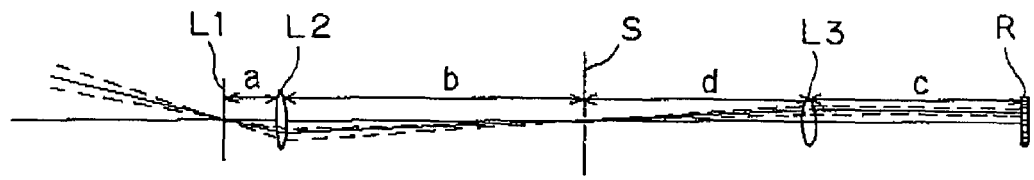
FIG. 6 is a side elevation illustrating the manner in which a slit is inserted into a focal position on the side of an object.

A three-dimensional light ray input apparatus 100 of Embodiment 3 is next described by referring to FIG. 6.

In the present embodiment, a slit S is placed into the position of the focal plane on the object side of the lens L3. Thus, the lens L3 selects parallel light focusing image sensor. This also yields advantages similar to those of Embodiment 2. In this case, image sensor area is more than wide lens L3 length in horizontal direction.

EMBODIMENT 4

Figure 7:
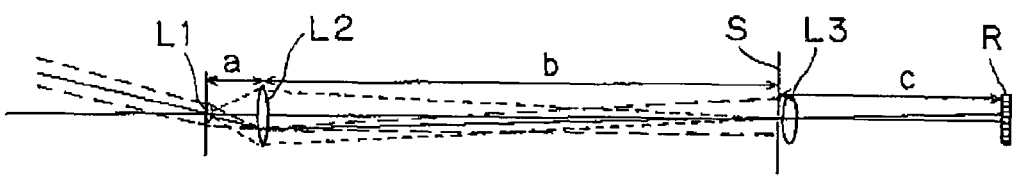
FIG. 7 is a side elevation illustrating Embodiment 4.

A three-dimensional light ray input apparatus 100 of Embodiment 4 is next described by referring to FIG. 7.

It is also conceivable to place the slit S in the lens L3 of the optical system of Embodiment 1 like Embodiments 2 or 3. FIG. 7 is a side elevation illustrating Embodiment 4.

As shown in FIG. 7, the slit S at the lens L3 corresponds to the effective aperture in the lens L1. The effective aperture in the lens L1 corresponds to the horizontal resolution. Because the effective aperture in the lens L1 is wide of light flux taking light ray images and wide of light flux is the most effective scanning interval. It can be also thought that the size of effective aperture is varied according to the resolution or amount of light (exposure) to be obtained. The resolution can be enhanced scanning more finely than the aperture pitch.

Furthermore, if the aperture of the lens L3 in the vertical direction can be controlled independently, the depth of field in the vertical direction can be varied. In other word, it is necessary to open aperture at "under exposure" since the S/N ratio decreases in dark scene; and it is better to close aperture at enough exposure and deep depth object. In the case of a scanning apparatus, fast exposure time is necessary for fast scan-speed. Conceivable is the design or construction which includes illuminator or lighting installation and has very small aperture for achieving the deep depth of field.

EMBODIMENT 5

Figure 8:
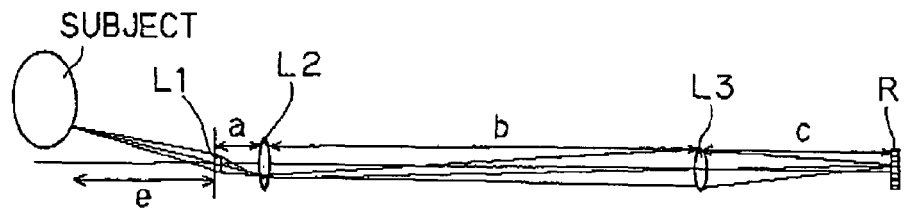
FIG. 8 is a side elevation illustrating Embodiment 5.

A three-dimensional light ray input apparatus 100 of Embodiment 5 is next described by referring to FIG. 8.

If the aperture of the lens L1 is increased in order to enhance the optical efficiency, the resolution at the gained position will deteriorate. Accordingly, it is conceivable to gain light after focusing it instead of gaining only parallel light from the object.

FIG. 8 is a side elevation illustrating Embodiment 5.

As shown in FIG. 8, let e be the distance between the object and the lens L1. Let f1 be the focal distance of the lens L1. Under these conditions, if there is a focusing relation given by $$1/e - 1/a = 1/f1$$

then a satisfactory result occurs. In the lens L3, the focal distance differs between the horizontal direction and the vertical direction.

In the horizontal direction, $1/(a+b+e)-1/c=-1/f3h$. In the vertical direction, $1/b-1/c=-1/f3v$.

Where the depth of field is small than the dept of the object, it is conceivable to make scans while varying the focal position plural times. In this way, the resolution can be increased while enhancing the optical efficiency with a large lens size.

EMBODIMENT 6

Figure 9:
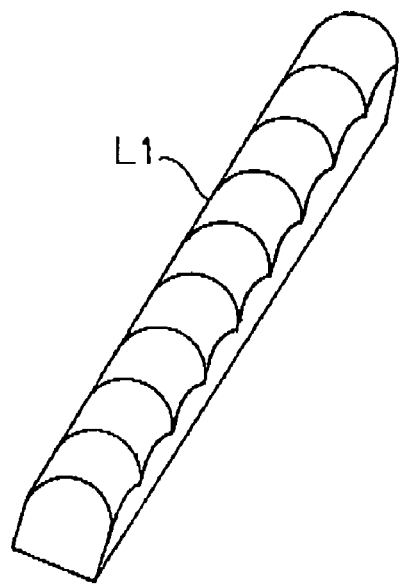
FIG. 9 is a view illustrating the shape of a lens L1 for obtaining two-dimensional parallax.
Figure 10:
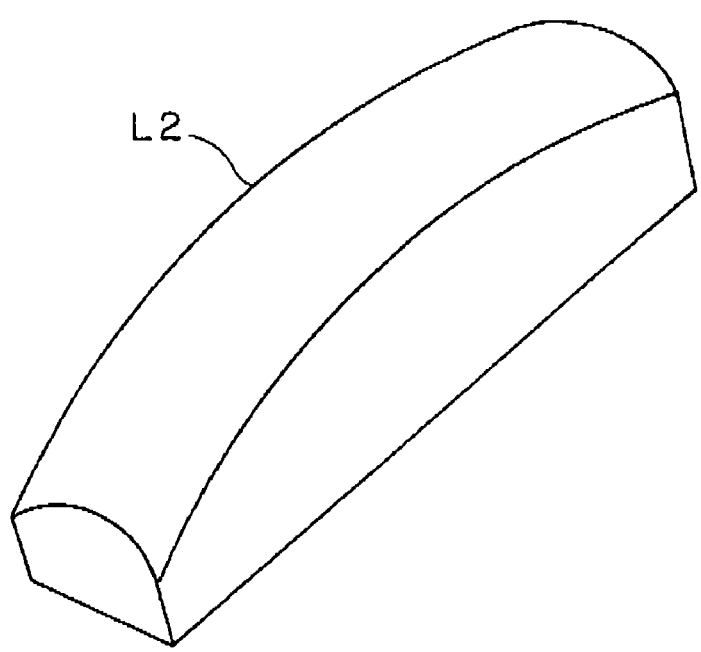
FIG. 10 is a view illustrating the shape of a lens L2 for obtaining two-dimensional parallax.

A three-dimensional light ray input apparatus 100 of Embodiment 6 is next described by referring to FIGS. 9 and 10.

It is also possible to obtain parallax in the vertical direction and parallax in the horizontal direction at the same time. FIG. 9 shows the shape of the lens L1 for gaining two-dimensional parallax. FIG. 10 shows the shape of the lens L2 that is a two-dimensional optical element for gaining two-dimensional parallax.

Where a line of lenses like fly's eyes is adopted as shown in FIG. 9, parallax in the vertical direction can be obtained in the same way as the methods of obtaining horizontal parallax already described in Embodiments 1-5. At this time, the action of a normal lens is imparted to the lens L2 as shown in FIG. 10. To obtain two-dimensional parallax, the lens needs to relay two-dimensional power. Because of this configuration, two-dimensional parallax can be obtained.

EMBODIMENT 7

Figure 11:
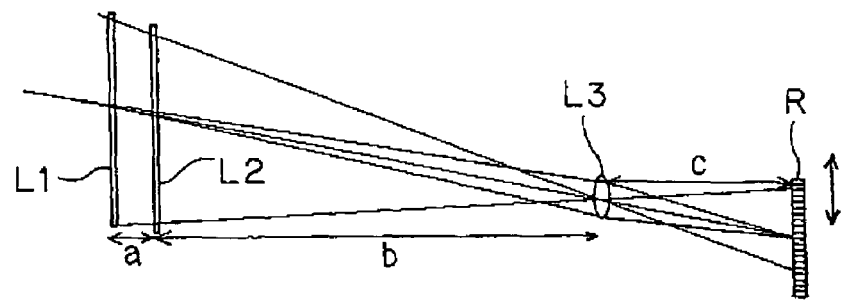
FIG. 11 is a view illustrating vertical scanning for obtaining vertical parallax.
Figure 12:
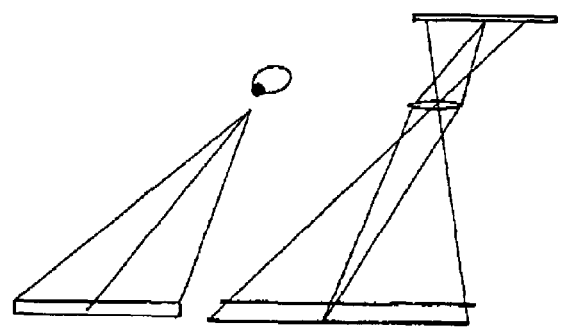
FIG. 12 is a view illustrating a directly placed display and a method of gaining contents for the display.

A three-dimensional light ray input apparatus 100 of Embodiment 7 is next described by referring to FIGS. 11 and 12.

It is also considered to make scans vertically to obtain vertical parallax. FIG. 11 illustrates scanning vertical parallax images to move in the vertical direction.

The vertical parallax images can be obtained by shifting the lens L3 to vertical direction together the array R of photoelectric elements. The shift amount of the lens and the array R of photoelectric elements is controlled such that arranged as straight-lined are center of array R of photoelectric elements and the lens L3 and the object, in order to curb variation or shift between the image center and the object center. Two-dimensional parallax can be obtained by making vertical scans in addition to horizontal scans.

If the array R of photoelectric elements is sufficiently long, it is not necessary to move the array R. An image center can be adjusted by amount of lens shift, even after imaging. Similarly, if lenses L1 and L2 have sufficiently long corresponding to parallax, it is not necessary to move them.

Figure 13:
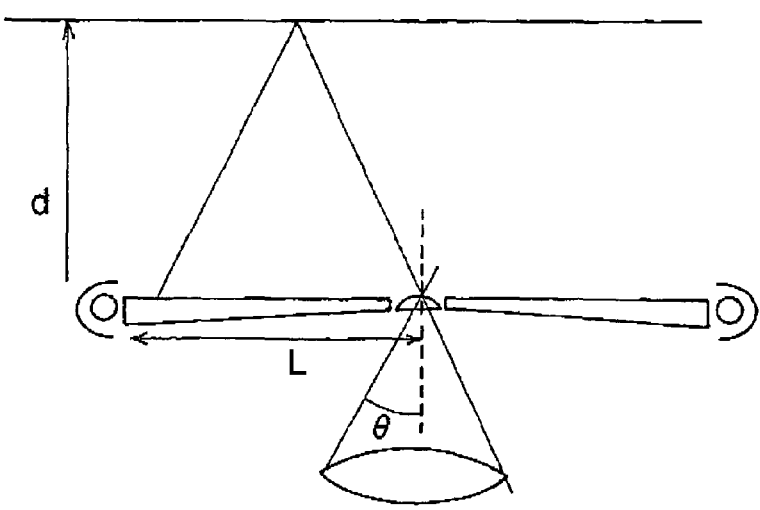
FIG. 13 is a view illustrating a wide range of illumination using planar light sources.

Furthermore, as shown in the left-part figure of FIG. 13, it is conceivable to utilize a three-dimensional image display device such that the device looks down on the display surface placed flatbed. If contents used at this time are imaged as shown in the right-part figure of FIG. 13, the same relation as the observing naked eye is achieved. Consequently, an image free of distortion can be obtained.

Additionally, vertical parallax can be scanned by newly installing a prism and scanning the angle of the prism. Vertical parallax can be obtained by varying the senses of three mirrors mounted therein to fold back the light. At this time, the array R of photoelectric elements can be tilted in conformity with the mirrors.

EMBODIMENT 8

A three-dimensional light ray input apparatus 100 of Embodiment 8 is next described by referring to FIGS. 13-16.

An example of illumination is illustratively shown in FIG. 13.

If the illuminated area is narrow, a reconstructing 3D image gives a feeling of oddness due to shade and anisotropy of the object. A light guide plate used in the backlight of a liquid crystal display can also be employed. As shown in FIG. 13, "d" is supposed as a max depth of taking 3D light ray image and θ is supposed as max angle of taking 3D light ray image. Width of light guide plate L is obtainable as $L=2d \tan \theta$. Because the object is illuminated flat brightness every angle.

Figure 14:
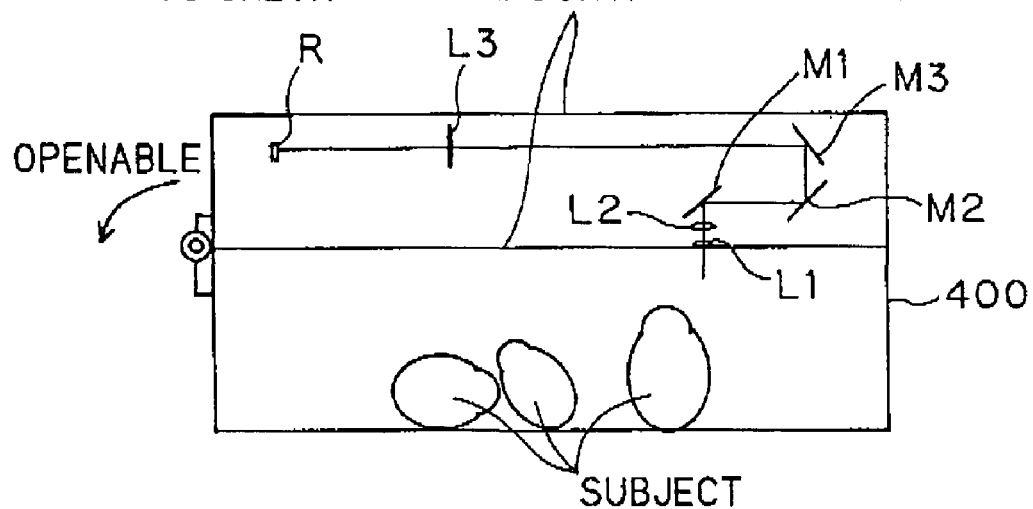
FIG. 14 is a view illustrating the manner in which a three-dimensional light ray input apparatus 100 is made an enclosure.

If the taking image space is made an enclosure as shown in FIG. 14, the taking image depth is determined by the height of the enclosure.

Figure 16:
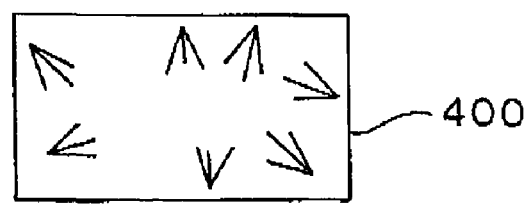
FIG. 16 is a view illustrating the manner in which the wall surfaces of the enclosure of a object are made planar light sources.

Furthermore, where the taking image space is made an enclosure as shown in FIG. 16, the wall surface of the enclosure can be illuminated as a planar light source. Furthermore, if the side plate at the light guide plate directly enters the lens, the obtained data will be hindered. Therefore, the side plate can be separated from taking-image space and can be machined with a mirror or the like.

It is also possible that plural direction illumination capable of being controlled independently are installed and that plural images can be taken while varying the illumination. Images under various illumination conditions can be synthesized by obtaining their images.

Making an enclosure is described. When an image is scanned over the object, the system is composed of an enclosure accommodating the object and a scanner gaining light ray information about the object. The scanner can be opened and closed as an enclosure cover accommodating the object. The scanner has a top portion made of glass to permit the user to check the composition while scanning the object.

Figure 15:
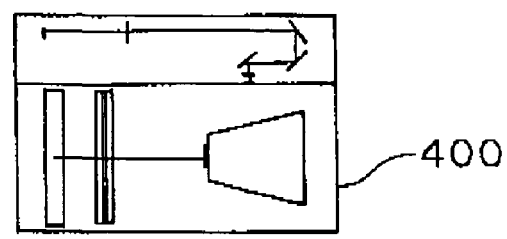
FIG. 15 is a view illustrating the manner in which three-dimensional light ray input apparatuses 100 are placed on a side surface and a top surface, respectively.

As shown in FIG. 15, light ray information not only from the top but also a side can be obtained at same time by installing scanners on the side and on the top, respectively.

EMBODIMENT 9

Figure 17:
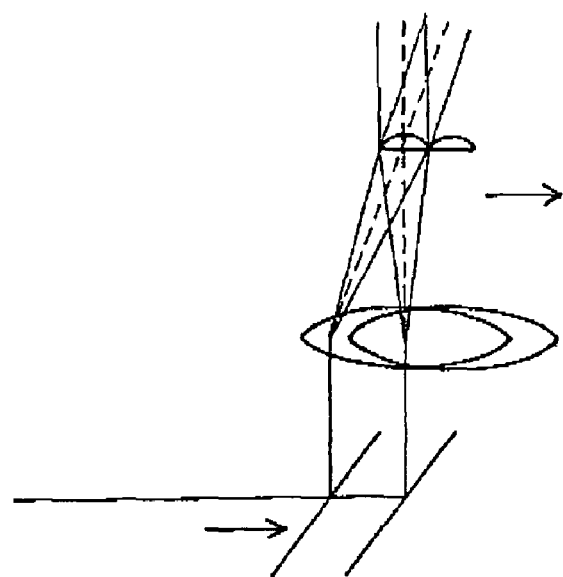
FIG. 17 is a view illustrating the manner in which light ray information is obtained with a 1-line sensor R.

A three-dimensional light ray input apparatus 100 of Embodiment 9 is next described by referring to FIG. 17.

FIG. 17 shows a configuration for obtaining parallax information with a line sensor R having only one rank array (in the case of color, three arrays of R, G, and B) of photoelectric elements.

The distance between lenses L1 and L2 is taken as the focal distance of the lens L2. And in this case, if it is also focal distance of the lens L1, scanning light ray is only parallel light ray. The scanning mirror is scanned while fixing the lenses L1 and L2. As such, parallax information at that position can be scanned. After gaining the parallax information at that position, the same procedure is repeated after moving next point the lenses L1 and L2. By adopting this procedure, parallax information and positional information can be scanned with only one line sensor R.

Similar effect can be obtained by making scanning while fixing L1, L2 and scanning mirror (i.e., the relative positional relationship is kept constant), shifting the positions of the scanning mirror relative to the L1 and L2, and making plural scans.

EMBODIMENT 10

Figure 18:
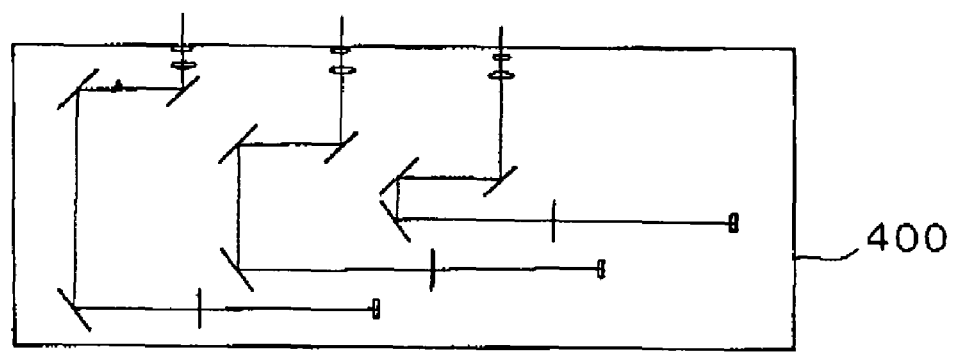
FIG. 18 is a view illustrating the manner in which scanning is performed using plural units.

A three-dimensional light ray input apparatus 100 of Embodiment 10 is next described by referring to FIG. 18.

Scanning can also be performed using plural sensor arrays R and lenses at a time. FIG. 18 is a side elevation of an apparatus in which three units are combined.

As shown in FIG. 18, the scanning time is reduced to only one third by combining units each having three lenses. Motion pictures can also be gained if sensors and lenses are increased in number.

EMBODIMENT 11

A three-dimensional light ray input apparatus 100 of Embodiment 11 is next described.

Color filters can be effectively used and parallax can be efficiently obtained by installing lenses L1 and L2 at an angle on the x-y plane.

A method of enhancing the efficiency by obliquely disposing an optical element that splits light rays is known in display devices. If three-dimensional light ray information is obtained using a lens tilted at the same angle as an output display, the information can be outputted to the display as it is.

EMBODIMENT 12

A three-dimensional light ray input apparatus 100 of Embodiment 12 is next described by referring to FIGS. 24 to 28.

Figure 24:
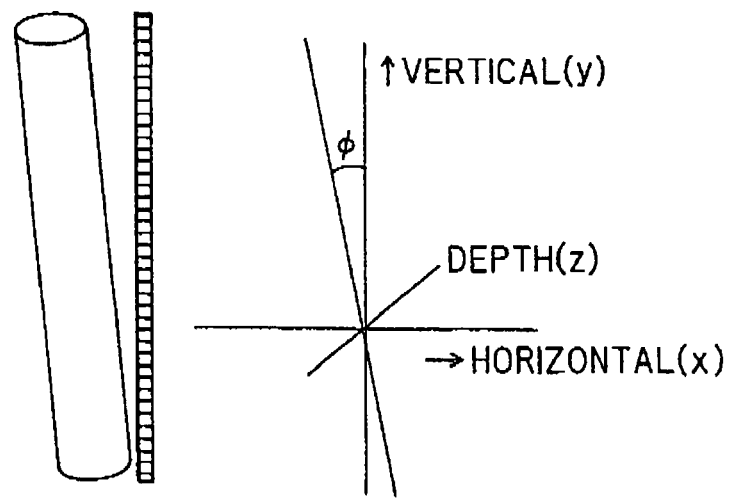
FIG. 24 is a view representing deviation of a lens.
Figure 25:
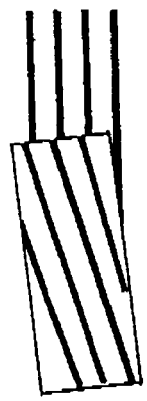
FIG. 25 is a view illustrating the manner in which vertical stripes vary when a rotation is made in the horizontal direction, i.e., on the xy-plane.
Figure 26:
FIG. 26 is a view illustrating the manner in which vertical stripes vary when a rotation is made in the depthwise direction, i.e., on the yz-plane.

If the lens is tilted, accurate data cannot be obtained. Corrective data is obtained by inputting a test pattern. A correction can be made to achieve correct data. With respect to rotation of the lens, the amount of deviation can be obtained with a test pattern having vertical stripes.

Where a horizontal rotation is made (i.e., on the xy-plane) when the lens is tilted at an angle of $\phi$ in a coordinate system as shown in FIG. 24, the stripes are seen to be tilted as shown in FIG. 25. Tilt in the depthwise direction (rotation on the yz-plane) varies the thickness of the lines as shown in FIG. 26.

The way of correction is image processing how to change image from corrective data into ideal stripes as described above. Where the correction is too large, the arrangement of optical elements can be modified, and a correction can be made by hardware.

Figure 21:
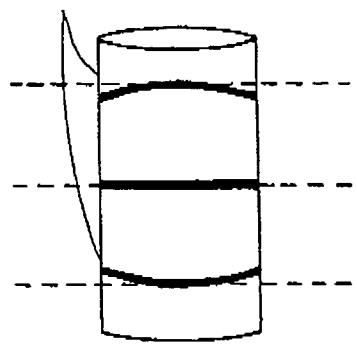
FIG. 21 is a view illustrating the manner in which an image is distorted by a lens.
Figure 27:
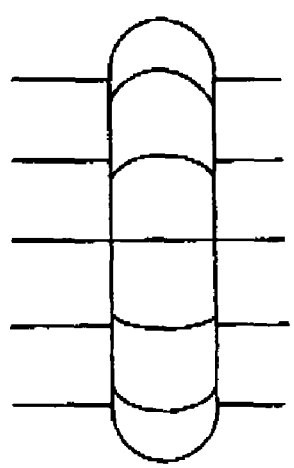
FIG. 27 is a view illustrating the manner in which an image is distorted by a lens.

As shown in FIGS. 21 and 27, a straight line that should be horizontal is distorted by a cylindrical lens. This is unavoidable because of optical characteristics. Therefore, the distortion data is gained. A correction can be made such that the line is change into an ideal straight line by image processing.

Figure 29:
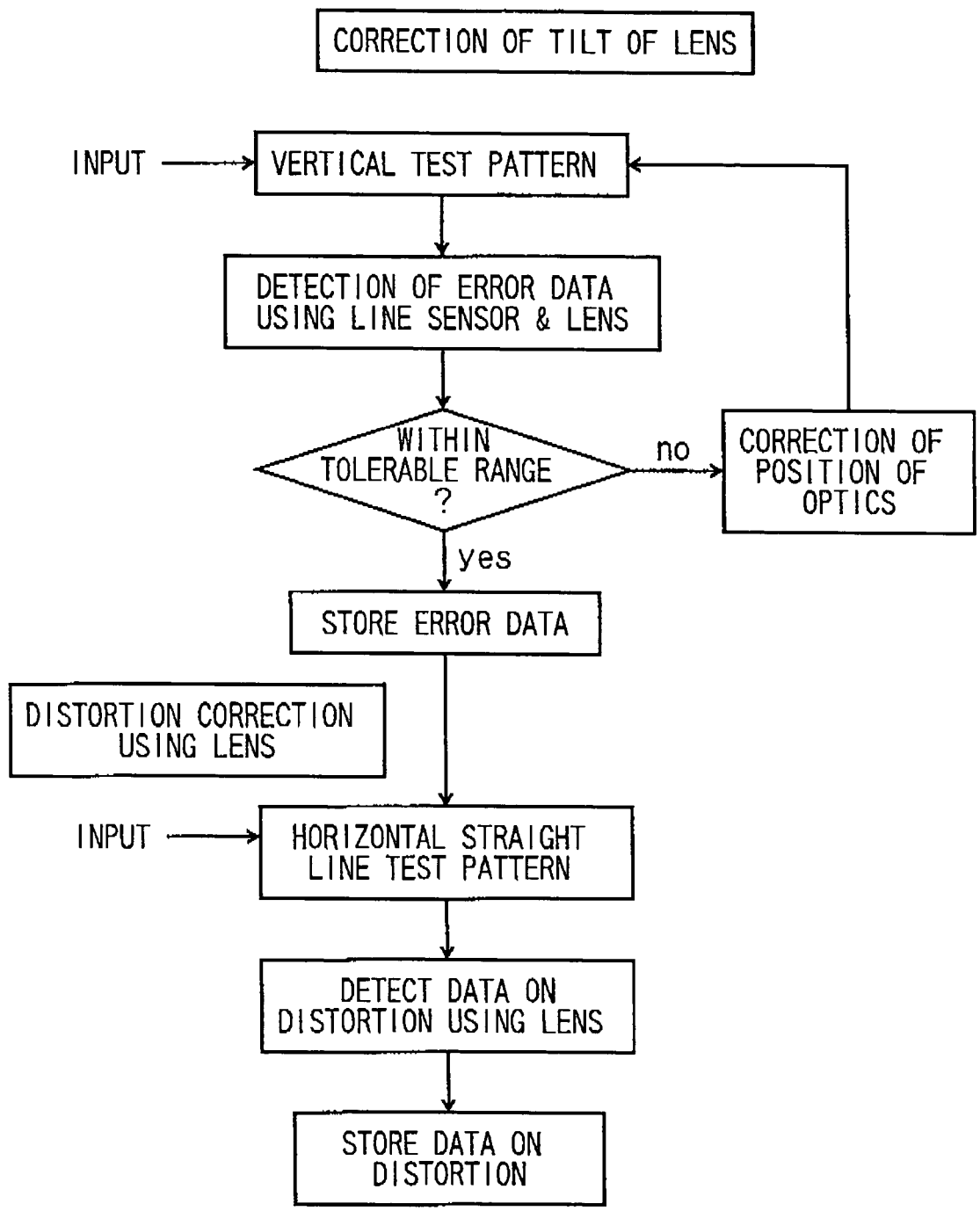
FIG. 29 is a flowchart illustrating correction of image distortion caused by a lens.

FIG. 29 shows one example of flowchart of acquisition of corrective data about finished products not yet shipped and a correction. The correction can be performed by this procedure.

That is, a vertical test pattern is obtained. Error data due to an array R of photoelectric elements and lenses L1, L2 is detected. If the error is within a tolerable range, the error data is stored. If the error is outside the range, the tilt of the lenses L1 and L2 is corrected. Then, a horizontal test pattern is obtained. Distortion data due to the lenses L1 and L2 is detected. The distortion data is stored.

EMBODIMENT 13

Figure 30:
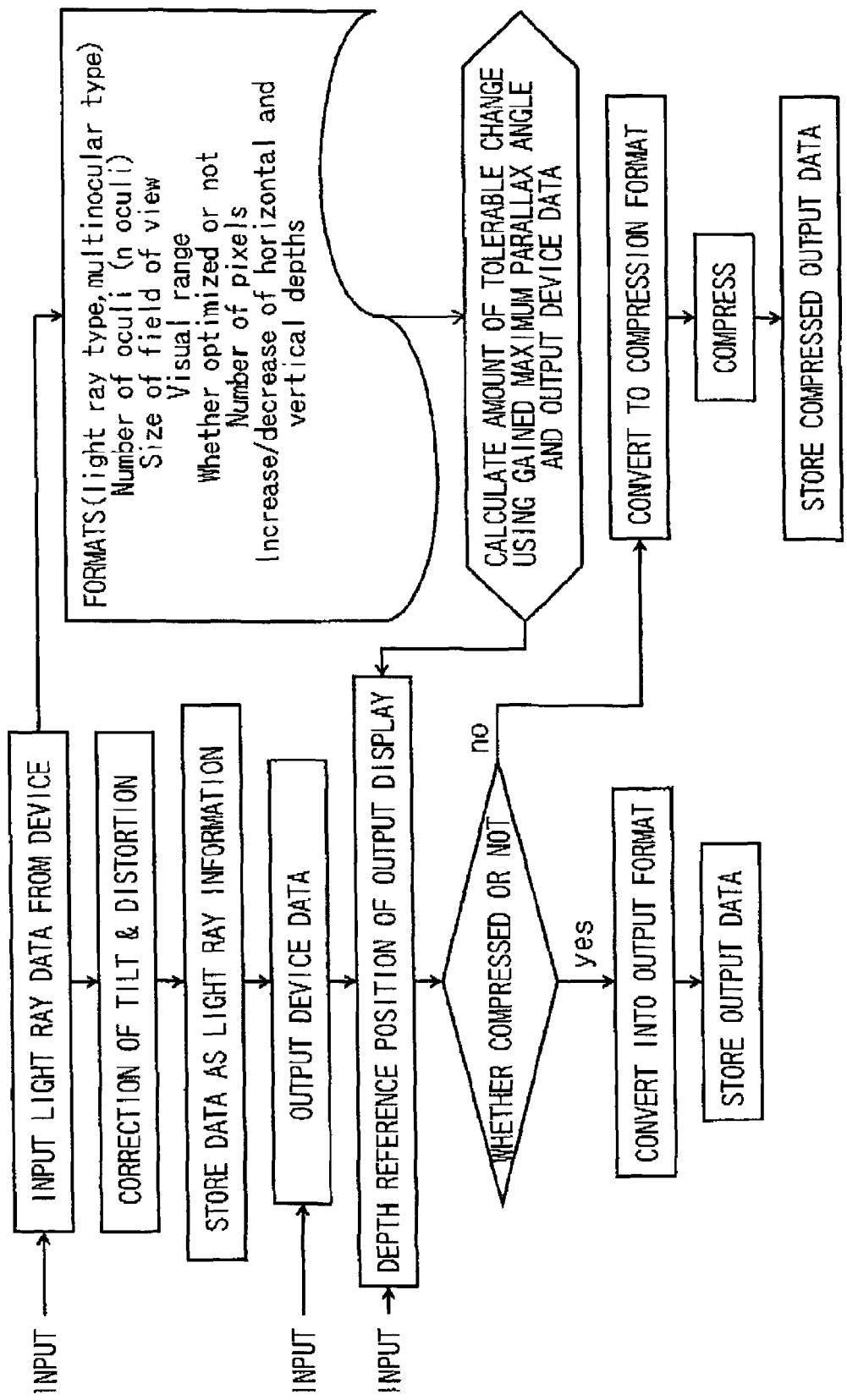
FIG. 30 is a flowchart illustrating conversion to an output format.

A three-dimensional light ray input apparatus 100 of Embodiment 13 is next described by referring to FIGS. 29 and 30.

The obtained data is outputted redundantly in conformity with the characteristics of the display. Alternatively, a format of data with which any 3D image reconstruction apparatus can cope is considered.

Figure 28:
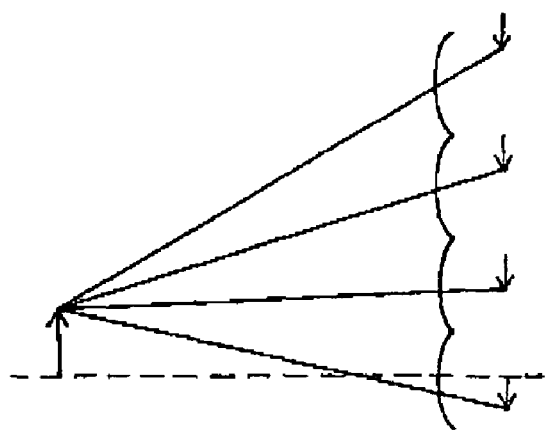
FIG. 28 is a view illustrating integral imaging.

The obtained data includes light ray information dependent on a positional function. If the data are held finely as they are, they can be displayed as redundant data even on the designed 3D display (stereoscopic type, multi-view type, or integral imaging type). Integral imaging is a method of representing objects by; decomposing a multiplicity of light rays by lenses and slits (pinholes); and integrating light rays as shown in FIG. 28 so that as same as such decomposing, a multiplicity of light rays reconstruct 3D image. The arrangement of light rays may be traced back according to the number of parallaxes in the three-dimensional image reconstruction apparatuses and observation distance when to reconstruct the image even on the designed 3D display.

Figure 19:
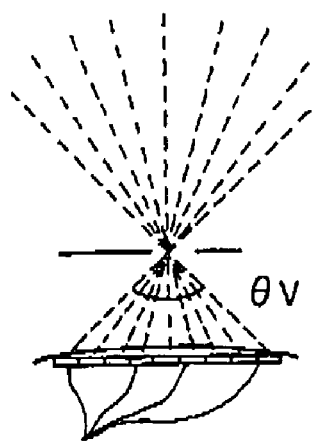
FIG. 19 is a view illustrating light ray sampling.
Figure 20:
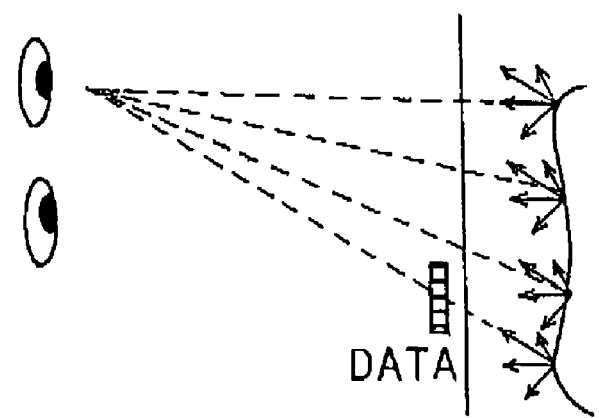
FIG. 20 is a view illustrating the manner in which a start position is traced back.
Figure 22:
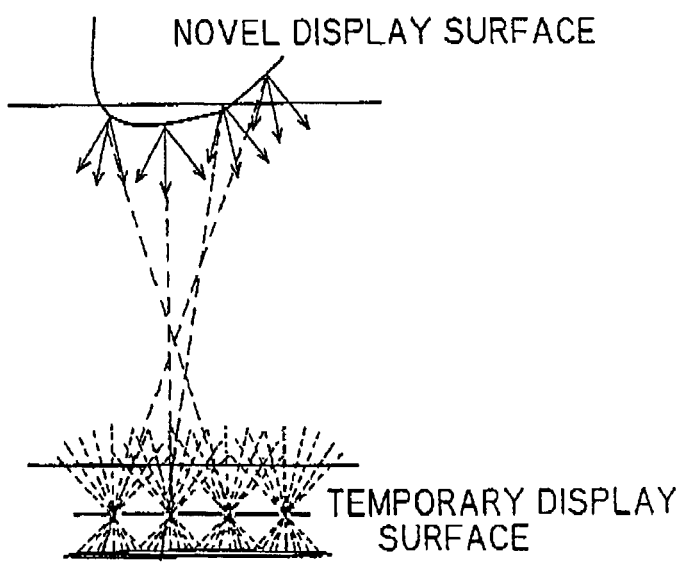
FIG. 22 is a view illustrating the manner in which a reference position for a display device that provides a display is varied.
Figure 23:
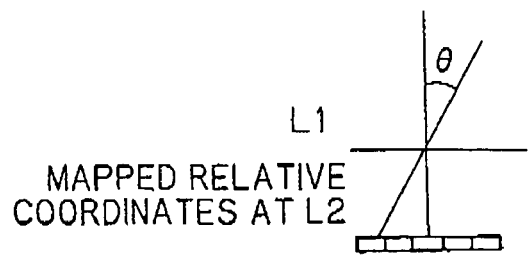
FIG. 23 is a view illustrating the manner in which a light ray angle and a light ray position are taken as storage formats.

For example, 4-view type pixel sampling when the angle of field of view is $\theta v$ is shown in FIG. 19. If there is a large amount of data available, any 3D image reconstruction apparatus can provide a display without distortion. At this time, the format can be stored using x and y at the angle $\theta$ between the surface of the lens L2 and the surface of the lens L1 and at the coordinate position of the lens L1 as shown in FIG. 23 because the angle of light rays is converted. As shown in FIG. 22, the position of the 3D image reconstruction apparatus can be varied.

To match the multi-view type, the observation position is defined, the starting point is defined, the display surface is defined and the pixel arrangement is determined by performing back tracing.

FIG. 30 illustrates one example of flowchart. By inputting data about the output device, data can be outputted in the output format for the device.

The input data is corrected for distortion and stored as 3D light ray information. The display range and image size are converted using the outputted information about the device. Information compression indicating whether is done or not is entered. Compression is performed, and outputting is performed.

EMBODIMENT 14

In the hereto-mentioned embodiments, an image of whole of the scanning range has to be captured when the light rays are not folded back by mirrors, because only the optical system or mechanism is moved. And, the range for capturing the light ray information, or an image obtained by whole of the optical elements, corresponds to a part of an image-taking or imaging element. Utilization efficiency of the image-taking element R falls down because their positions vary depending on scanning positions. In view of this, it is aimed to provide a three-dimensional light-ray input apparatus that eliminates a problem due to positional difference between the image-taking element R and the a range for obtaining light-ray information, as to achieve efficient utilization of the image-taking elements, and cost and space reduction.

Figure 39:
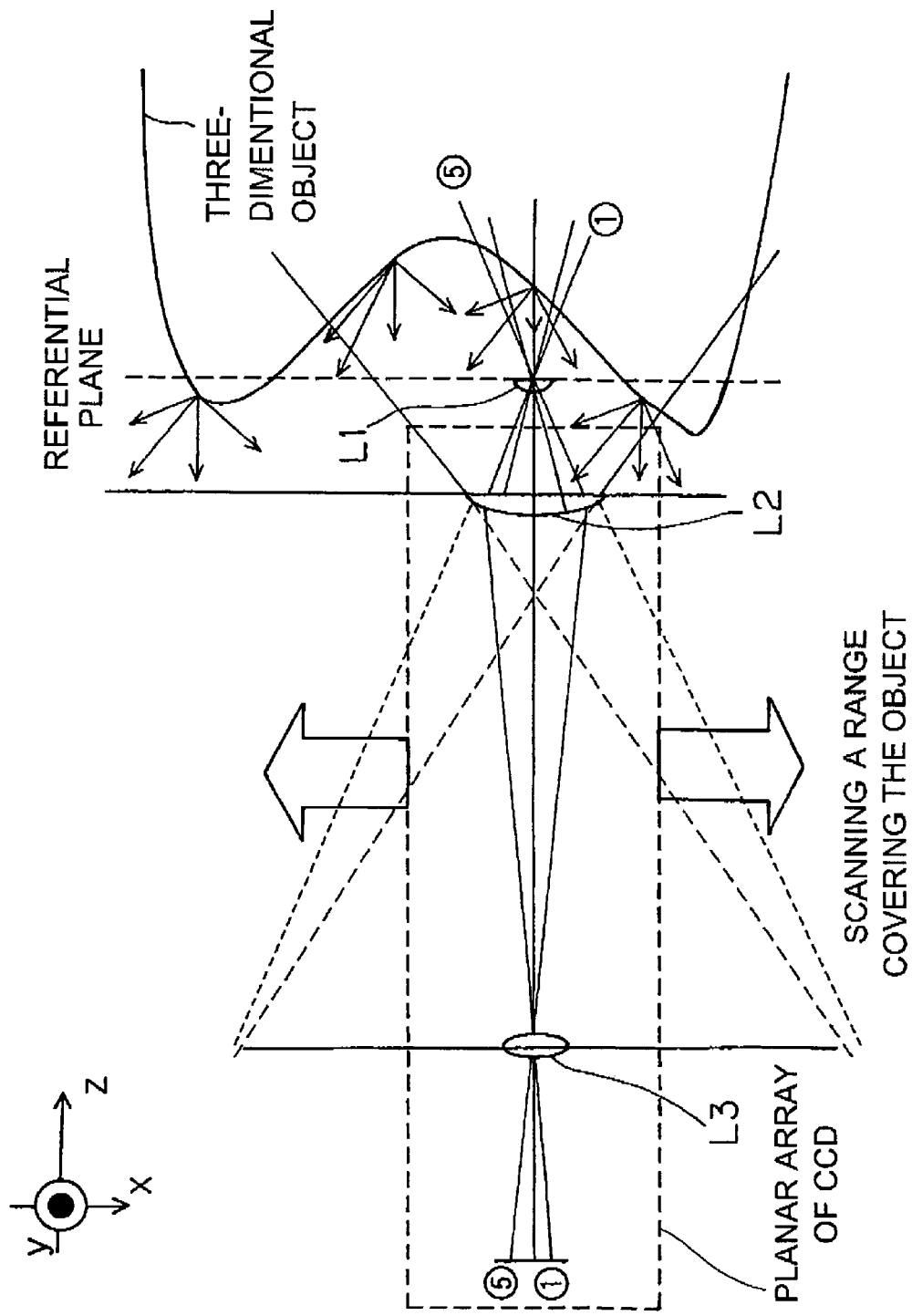
FIG. 39 is an explanatory view for the embodiment 14.

FIG. 16 is a view for explaining construction of the Embodiment 14. Scanning-wise moving along the x-axis at same velocity in a manner as an integral body is made in respect of the focusing element L3 and the image-taking element R, or a planar array of the CCDs, as well as the lenses L1 and L2 that scan-wise move within a rectangular range indicated by a broken line in the FIG. 39. As a result of such en-bloc moving in a scanning manner, the light-ray information is obtained solely through respectively same parts of the image-taking element; and its efficient utilization is achieved.

EMBODIMENT 15

The lens L1 is replaced by the slit S, which is a light-ray controlling element in a first category. The advantage or performance same as the embodiment 14 is achieved when the slit S and the lens L2 are scanning-wise moved at a same velocity with the focusing lens L3 and the image-taking element R.

EMBODIMENT 16

The lens L1 is omitted in a manner as the embodiment 14; and an aperture or diaphragm is provided as a light-ray controlling element of second category. The advantage or performance same as the embodiment 14 is achieved when the focusing lens L3 for image formation and the aperture element as well as the image-taking element R are scanning-wise moved at a velocity same with that of the lens L2. When the light rays are folded back by three pieces of the mirrors and their scanning-wise moving is made, the advantage or performance same as the embodiments 14-16 is achieved.

EMBODIMENT 17

When an optical system including the three mirrors moves back and forth, or when whole of image-taking optical system is integrally driven to be scanning-wise moved, a range covered by the lens L2 is enough as a range for the image taking. In the hereto-mentioned embodiments, the aspect ratio (or a ratio between length-wise dimension and width-wise dimension) of the image-taking element may differ from that of the lens L2 or a second optical element. In view of this, it is aimed to provide a three-dimensional light-ray input apparatus that eliminates a problem due to difference in the aspect ratio between the image-taking element R and the second optical element, as to achieve efficient utilization of the image-taking element, and cost and space reduction. When a general-purpose area sensor is used for taking image, the difference in aspect ratio hampers the efficient utilization of "pixels" of the image-taking element even if adjustment such as zooming is made.

Figure 40:
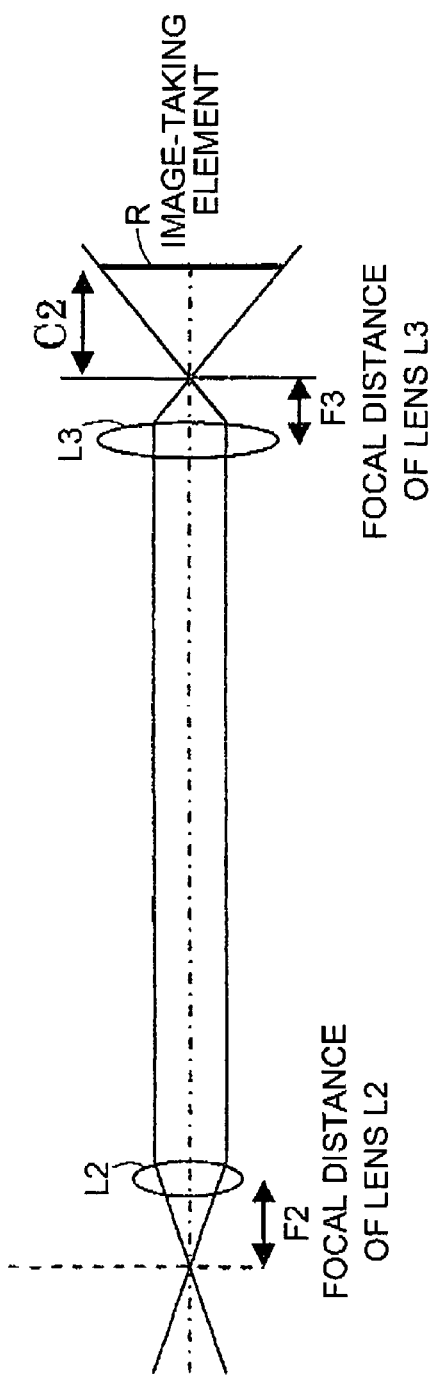
FIG. 40 is an explanatory view for the embodiment 17.

In below, construction of embodiment 17 is described which is for curbing problem due to the difference in aspect ratio between the image-taking element R and the lens L2; by use of FIG. 40.

A telecentric optical system at image side is adopted only in horizontal direction, in order to curb the problem due to the difference in aspect ratio. Because scaling factor of the telecentric optical system is constant, a lens L3 having a diameter larger than that of the lens L2 is required. A distance C2 between the focal point of the lens L3 and the image-taking element R is adjusted in a manner to take an image from a range larger in diameter than the lens L", so that the scaling factor is modified or varied to achieve an image-taking range in conformity of the object. Actually, focusing is made in vertical direction, and thus, the scaling factor is decided by focusing of the lens L3 for image formation.

EMBODIMENT 18

Figure 41:
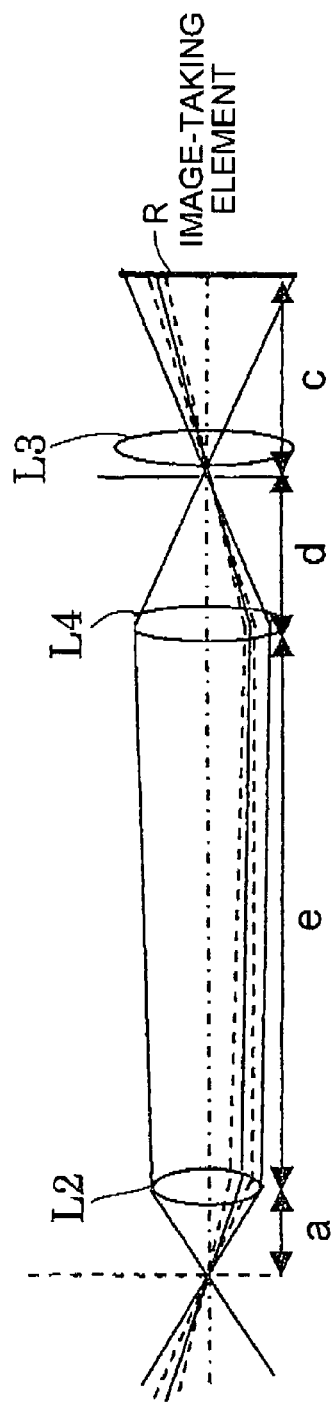
FIG. 41 is an explanatory view for the embodiment 18.

Embodiment 18 is explained by use of FIG. 41. When diameter of the lens L2 is small, there is adopted a lens L4 that focus the light rays only or predominantly in a horizontal direction, or a cylindrical lens, as to achieve zooming only or predominantly in horizontal direction. In this way, the difference in the aspect ratio is canceled.

What is claimed is:

1. A three-dimensional light ray input apparatus for inputting light from a three-dimensional object which is present on a plane consisting of x-y axes in an orthogonal coordinate system and which has a depth in a z-axis direction, said apparatus comprising:
   a first optical element, a second optical element, a focusing element, an imaging element, and a recording portion,
   wherein each of said first and second optical elements has a length in a y-axis direction,
   wherein said imaging element is capable of imaging a two-dimensional image,
   wherein said first and second optical elements move together in an x-axis direction and scan light from the object,
   wherein said first optical element distributes light rays from surroundings of the object onto said second optical element,
   wherein light focused on said second optical element is brought to a focus on said imaging element by said focusing element,
   wherein said imaging element images (i) said light brought to a focus, (ii) light, which is present at each position in the x-axis direction on said second optical element is at a position on said imaging element that corresponds to each position in the x-axis direction, and (iii) light, which is present at each position on the second optical element in the y-axis direction, at a position on the imaging element that corresponds to each position in the y-axis direction, and
   wherein said recording portion records images imaged by said imaging element in the order of the scanning.

2. A three-dimensional light ray input apparatus for inputting light from a three-dimensional object which is present on a plane consisting of x-y axes in an orthogonal coordinate system and which has a depth in a z-axis direction, said apparatus comprising:
   a first light aperture control element, a second optical element, a focusing element, an imaging element, and a recording portion,
   wherein each of said first light aperture control element and second optical element has a length in a y-axis direction,
   wherein said imaging element is capable of imaging a two-dimensional image,
   wherein said first and second optical elements move together in an x-axis direction and scan light from the object,
   wherein said first light aperture control element distributes light rays from surroundings of the object onto said second optical element,
   wherein light focused on said second optical element is brought to a focus on said imaging element by said focusing element,
   wherein said imaging element images (i) said light brought to a focus, (ii) light, which is present at each position in the y-axis direction on said second optical element, at a position on said imaging element that corresponds to each position in the y-axis direction, and (iii) light, which is present at each position on the second optical element in the x-axis direction, at a position on the imaging element that corresponds to each position in the x-axis direction, and
   wherein said recording portion records images imaged by said imaging element in the order of the scanning.

3. A three-dimensional light ray input apparatus for inputting light from a three-dimensional object which is present on a plane consisting of x-y axes in an orthogonal coordinate system and which has a depth in a z-axis direction, said apparatus comprising:

a second optical element, a second light aperture control element, a focusing element, an imaging element, and a recording portion, wherein said second optical element has a length in a y-axis direction, wherein said imaging element is capable of imaging a two-dimensional image, wherein said second optical element moves in an x-axis direction and scans light from the object, wherein light from the object is incident on said second optical element, wherein said light incident on the second optical element is brought to a focus on said imaging element via said second light aperture control element by said focusing element, wherein said imaging element images (i) said light brought to a focus, (ii) light, which is present at each position in the y-axis direction on said second optical element, at a position on said imaging element that corresponds to each position in the y-axis direction, and (iii) light, which is present at each position on the second optical element in the x-axis direction, at a position on the imaging element that corresponds to each position in the x-axis direction, and wherein said recording portion records images imaged by said imaging element in the order of the scanning.

4. A three-dimensional light ray input as set forth in claim 1, wherein said first optical element is a single linear array of optical subelements.

5. A three-dimensional light ray input apparatus as set forth in claim 1, wherein said second optical element is a single linear array of optical subelements.

6. A three-dimensional light ray input apparatus as set forth in claim 2, wherein said second optical element is a single linear array of optical subelements.

7. A three-dimensional light ray input apparatus as set forth in claim 3, wherein said second optical element is a single linear array of optical subelements.

8. A three-dimensional light ray input apparatus as set forth in claim 1, wherein said focusing element performs scanning along the y-axis direction of said second optical element by means of a mirror or prism.

9. A three-dimensional light ray input apparatus as set forth in claim 2, wherein said focusing element performs scanning along the y-axis direction of said second optical element by means of a mirror or prism.

10. A three-dimensional light ray input apparatus as set forth in claim 3, wherein said focusing element performs scanning along the y-axis direction of said second optical element by means of a mirror or prism.

11. A three-dimensional light ray input apparatus as set forth in claim 1, wherein said focusing element is a variable focus.

12. A three-dimensional light ray input apparatus as set forth in claim 2, wherein said focusing element is a variable focus.

13. A three-dimensional light ray input apparatus as set forth in claim 3, wherein said focusing element is a variable focus.

14. A three-dimensional light ray input apparatus as set forth in claim 3, wherein said second light aperture control element is present near a principal point of said focusing element.

15. A three-dimensional light ray input apparatus as set forth in claim 3, wherein said second light aperture control element is present near a focal plane side of object.

16. A three-dimensional light ray input apparatus as set forth in claim 3, wherein said second light aperture control element is capable of controlling an aperture width in the x-axis direction and an aperture width in the y-axis direction independently.

17. A three-dimensional light ray input apparatus as set forth in claim 1, wherein
 (A) there are provided three reflective elements between said second optical element and said focusing element,
 (B) said three reflective elements move together with said second optical element,
 (C) the reflective element reflecting light from said second optical element moves at a speed twice a speed at which the other two reflective elements move, and
 (D) an optical path length from said second optical element to said fixed focusing element is constant.

18. A three-dimensional light ray input apparatus as set forth in claim 2, wherein
 (A) there are provided three reflective elements between said second optical element and said focusing element,
 (B) said three reflective elements move together with said second optical element,
 (C) the reflective element reflecting light from said second optical element moves at a speed twice a speed at which the other two reflective elements move, and
 (D) an optical path length from said second optical element to said fixed focusing element is constant.

19. A three-dimensional light ray input apparatus as set forth in claim 3, wherein
 (A) there are provided three reflective elements between said second optical element and said focusing element,
 (B) said three reflective elements move together with said second optical element,
 (C) the reflective element reflecting light from said second optical element moves at a speed twice a speed at which the other two reflective elements move, and
 (D) an optical path length from said second optical element to said fixed focusing element is constant.

20. A three-dimensional light ray input apparatus as set forth in claim 11, wherein a spacing between said first and second optical elements is set equal to the focal distance of said second optical element, and wherein said reflective elements are scanned while fixing said first and second optical elements.

21. A three-dimensional light ray input apparatus as set forth in claim 18, wherein a spacing between said first and second optical elements is set equal to the focal distance of said second optical element, and wherein said reflective elements are scanned while fixing said first and second optical elements.

22. A three-dimensional light ray input apparatus as set forth in claim 19, wherein a spacing between said first and second optical elements is set equal to the focal distance of said second optical element, and wherein said reflective elements are scanned while fixing said first and second optical elements.

23. A three-dimensional light ray input apparatus as set forth in claim 1, wherein the focusing element and the imaging element moves in the x-axis direction integrally with the first and second optical elements as to scanning-wise receiving light rays from the three-dimensional object.

24. A three-dimensional light ray input apparatus as set forth in claim 2, wherein the focusing element and the imaging element moves in the x-axis direction integrally with the first and second optical elements as to scanning-wise receive light rays from the three-dimensional object.

25. A three-dimensional light ray input apparatus as set forth in claim 3, wherein the second light aperture control element as well as the focusing element and the imaging element moves in the x-axis direction integrally with the second optical element as to scanning-wise receive light rays from the three-dimensional object.

26. A three-dimensional light ray input apparatus as set forth in claim 3, wherein the focusing element and the imaging element moves in the x-axis direction integrally with the second optical element as to scanning-wise receive light rays from the three-dimensional object; and the second light aperture control element is present near an object-side focal plane of the focusing element.

27. A three-dimensional light ray input apparatus as set forth in claim 23, further comprising a third optical element that achieves scaling of imaging in a maner that only a range capable to obtain light rays from the second optical element is focused on a image-capturing area of the imaging element.

28. A three-dimensional light ray input apparatus as set forth in claim 24, further comprising a third optical element that achieves scaling of imaging in a maner that only a range capable to obtain light rays from the second optical element is focused on a image-capturing area of the imaging element.

29. A three-dimensional light ray input apparatus as set forth in claim 25, further comprising a third optical element that achieves scaling of imaging in a maner that only a range capable to obtain light rays from the second optical element is focused on a image-capturing area of the imaging element.

30. A three-dimensional light ray input apparatus as set forth in claim 26, further comprising a third optical element that achieves scaling of imaging in a maner that only a range capable to obtain light rays from the second optical element is focused on a image-capturing area of the imaging element.

31. A three-dimensional light ray input apparatus as set forth in claim 23, wherein
   (A) there are provided three reflective elements between said second optical element and said focusing element,
   (B) said three reflective elements move together with said second optical element,
   (C) the reflective element reflecting light from said second optical element moves at a speed twice a speed at which the other two reflective elements move, and
   (D) an optical path length from said second optical element to said fixed focusing element is constant.

32. A three-dimensional light ray input apparatus as set forth in claim 24, wherein
   (A) there are provided three reflective elements between said second optical element and said focusing element,
   (B) said three reflective elements move together with said second optical element,
   (C) the reflective element reflecting light from said second optical element moves at a speed twice a speed at which the other two reflective elements move, and
   (D) an optical path length from said second optical element to said fixed focusing element is constant.

33. A three-dimensional light ray input apparatus as set forth in claim 24, wherein
   (A) there are provided three reflective elements between said second optical element and said focusing element,
   (B) said three reflective elements move together with said second optical element,
   (C) the reflective element reflecting light from said second optical element moves at a speed twice a speed at which the other two reflective elements move, and
   (D) an optical path length from said second optical element to said fixed focusing element is constant.

34. A three-dimensional light ray input apparatus as set forth in claim 25, wherein
   (A) there are provided three reflective elements between said second optical element and said focusing element,
   (B) said three reflective elements move together with said second optical element,
   (C) the reflective element reflecting light from said second optical element moves at a speed twice a speed at which the other two reflective elements move, and
   (D) an optical path length from said second optical element to said fixed focusing element is constant.

* * * * *